US012190484B2

(12) United States Patent
Amirghodsi et al.

(10) Patent No.: US 12,190,484 B2
(45) Date of Patent: Jan. 7, 2025

(54) GENERATING MODIFIED DIGITAL IMAGES USING DEEP VISUAL GUIDED PATCH MATCH MODELS FOR IMAGE INPAINTING

(71) Applicant: Adobe Inc., San Jose, CA (US)

(72) Inventors: Sohrab Amirghodsi, Seattle, WA (US); Lingzhi Zhang, Philadelphia, PA (US); Zhe Lin, Fremont, CA (US); Connelly Barnes, Seattle, WA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 345 days.

(21) Appl. No.: 17/202,019

(22) Filed: Mar. 15, 2021

(65) Prior Publication Data

US 2022/0292650 A1    Sep. 15, 2022

(51) Int. Cl.
*G06T 5/77* (2024.01)
*G06N 3/08* (2023.01)
(Continued)

(52) U.S. Cl.
CPC ............. *G06T 5/77* (2024.01); *G06N 3/08* (2013.01); *G06T 3/4053* (2013.01); *G06T 7/11* (2017.01);
(Continued)

(58) Field of Classification Search
CPC ......... G06T 5/005; G06T 3/4053; G06T 7/11; G06T 7/50; G06T 2207/20081;
(Continued)

(56) References Cited

U.S. PATENT DOCUMENTS 10,699,151 B2 * 6/2020 Mishra ................ G06V 10/454
2008/0238942 A1 10/2008 Sun et al.
(Continued)

FOREIGN PATENT DOCUMENTS

CN    114677311 A    6/2022

OTHER PUBLICATIONS

Yang, Shiyuan, Haitao Liang, Yi Wang, Huaiyu Cai, and Xiaodong Chen. 2020. "Image Inpainting Based on Multi-Patch Match with Adaptive Size" Applied Sciences 10, No. 14: 4921. (Year: 2020).*
(Continued)

*Primary Examiner* — Andrae S Allison
*Assistant Examiner* — Emmanuel Silva-Avina
(74) *Attorney, Agent, or Firm* — Keller Preece PLLC

(57) ABSTRACT

The present disclosure relates to systems, methods, and non-transitory computer readable media for accurately, efficiently, and flexibly generating modified digital images utilizing a guided inpainting approach that implements a patch match model informed by a deep visual guide. In particular, the disclosed systems can utilize a visual guide algorithm to automatically generate guidance maps to help identify replacement pixels for inpainting regions of digital images utilizing a patch match model. For example, the disclosed systems can generate guidance maps in the form of structure maps, depth maps, or segmentation maps that respectively indicate the structure, depth, or segmentation of different portions of digital images. Additionally, the disclosed systems can implement a patch match model to identify replacement pixels for filling regions of digital images according to the structure, depth, and/or segmentation of the digital images.

20 Claims, 12 Drawing Sheets

(51) Int. Cl.
    *G06T 3/4053*     (2024.01)
    *G06T 7/11*     (2017.01)
    *G06T 7/50*     (2017.01)

(52) U.S. Cl.
    CPC ...... *G06T 7/50* (2017.01); *G06T 2207/20081* (2013.01); *G06T 2207/20084* (2013.01)

(58) Field of Classification Search
    CPC . G06T 2207/20084; G06T 11/60; G06N 3/08; G06N 3/045; G06N 3/0475; G06N 3/09; G06N 3/096; G06N 3/04
    USPC .......................................................... 382/156
    See application file for complete search history.

(56) References Cited

U.S. PATENT DOCUMENTS

| | | | |
|---|---|---|---|
| 2018/0165798 A1* | 6/2018 | Lin | G06T 5/005 |
| 2020/0242771 A1* | 7/2020 | Park | G06T 11/001 |
| 2021/0142497 A1* | 5/2021 | Pugh | G06T 7/55 |
| 2021/0342984 A1 | 11/2021 | Lin et al. | |

OTHER PUBLICATIONS

Zeng, Y., Lin, Z., Yang, J., Zhang, J., Shechtman, E., Lu, H. 2020. "High-Resolution Image Inpainting with Iterative Confidence Feedback and Guided Upsampling" In: Vedaldi, A., Bischof, H., Brox, T., Frahm, JM. (eds) Computer Vision—ECCV 2020. ECCV 2020. (Year: 2020).*

Cho, J., Min, D., Kim, Y., & Sohn, K. (2019). A large RGB-D dataset for semi-supervised monocular depth estimation. arXiv preprint arXiv:1904.10230. (Year: 2019).*

Jin, D., & Bai, X. (2018). Patch-sparsity-based image inpainting through a facet deduced directional derivative. IEEE Transactions on Circuits and Systems for Video Technology, 29(5), 1310-1324. (Year: 2018).*

Connelly Barnes, Eli Shechtman, Adam Finkelstein, and Dan B Goldman. Patchmatch: A randomized correspondence algorithm for structural image editing. ACM Trans. Graph., 28(3):24, 2009.

Alexei A Efros and William T Freeman. Image quilting for texture synthesis and transfer. In Proceedings of the 28th annual conference on Computer graphics and interactive techniques, pp. 341-346, 2001.

Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pp. 2672-2680, 2014.

Vivek Kwatra, Irfan Essa, Aaron Bobick, and Nipun Kwatra. Texture optimization for example-based synthesis. In ACM SIGGRAPH 2005 Papers, pp. 795-802. 2005.

Guilin Liu, Fitsum A Reda, Kevin J Shih, Ting-Chun Wang, Andrew Tao, and Bryan Catanzaro. Image inpainting for irregular holes using partial convolutions. In Proceedings of the European Conference on Computer Vision (ECCV), pp. 85-100, 2018.

Deepak Pathak, Philipp Krahenbuhl, Jeff Donahue, Trevor Darrell, and Alexei A Efros. Context encoders: Feature learning by inpainting. In Proceedings of the IEEE conference on computer vision and pattern recognition, pp. 2536-2544, 2016.

Ke Sun, Yang Zhao, BoruiJiang, Tianheng Cheng, Bin Xiao, Dong Liu, Yadong Mu, Xinggang Wang, Wenyu Liu, and Jingdong Wang. High-resolution representations for labeling pixels and regions. arXiv preprint arXiv:1904.04514, 2019.

Ke Xian, Jianming Zhang, Oliver Wang, Long Mai, Zhe Lin, and Zhiguo Cao. Structure-guided ranking loss for single image depth prediction. In Proceedings of the IEEE/CVF Conference on Computer Vision and Pattern Recognition, pp. 611-620, 2020.

Lixu, Qiong Yan, Yang Xia, and Jiaya Jia. Structure extraction from texture via relative total variation. ACM transactions on graphics (TOG), 31(6):1-10, 2012.

Chao Yang, Xin Lu, Zhe Lin, Eli Shechtman, Oliver Wang, and Hao Li. High-resolution image inpainting using multi-scale neural patch synthesis. In Proceedings of the IEEE Conference on Computer Vision and Pattern Recognition, pp. 6721-6729, 2017.

Zili Yi, Qiang Tang, Shekoofeh Azizi, Daesik Jang, and Zhan Xu. Contextual residual aggregation for ultra high-resolution image inpainting. In Proceedings of the IEEE/CVF Conference on Computer Vision and Pattern Recognition, pp. 7508-7517, 2020.

Jiahui Yu, Zhe Lin, Jimei Yang, Xiaohui Shen, Xin Lu, and Thomas S Huang. Generative image inpainting with contextual attention. In Proceedings of the IEEE conference on computer vision and pattern recognition, pp. 5505-5514, 2018.

Jiahui Yu, Zhe Lin, Jimei Yang, Xiaohui Shen, Xin Lu, and Thomas S Huang. Free-form image inpainting with gated convolution. In Proceedings of the IEEE International Conference on Computer Vision, pp. 4471-4480, 2019.

Yanhong Zeng, Jianlong Fu, Hongyang Chao, and Baining Guo. Learning pyramid-context encoder network for high-quality image inpainting. In Proceedings of the IEEE conference on computer vision and pattern recognition, pp. 1486-1494, 2019.

Yu Zeng, Zhe Lin, Jimei Yang, Jianming Zhang, Eli Shechtman, and Huchuan Lu. High-resolution image inpainting with iterative confidence feedback and guided upsampling. arXiv preprint arXiv:2005.11742, 2020.

Bolei Zhou, Hang Zhao, Xavier Puig, Sanja Fidler, Adela Barriuso, and Antonio Torralba. Scene parsing through ade20k dataset. In Proceedings of the IEEE conference on computer vision and pattern recognition, pp. 633-641, 2017.

Hertzmann, Aaron & Jacobs, Charles & Oliver, Nuria & Curless, Brian & Salesin, David. (2001). Image Analogies. Proceedings of ACM SIGGRAPH. 2001. 10.1145/383259.383295.

Combined Search and Examination Report as received in UK application GB2203239.5 dated Sep. 1, 2022.

2021 IEEE International Conference on Multimedia and Expo (ICME), 2021, Wei Shuxin et al., "Structural Prior Guided Image Inpainting for Complex Scene", p. 1-6.

* cited by examiner

GENERATING MODIFIED DIGITAL IMAGES USING DEEP VISUAL GUIDED PATCH MATCH MODELS FOR IMAGE INPAINTING

BACKGROUND

Recent years have seen significant developments in software and hardware platforms for digital image inpainting to reconstruct missing or flawed regions of digital images. Indeed, some digital image editing applications utilize inpainting functions to remove unwanted objects or distracting elements from digital images and to automatically fill the region of the removed pixels with a plausible result. For example, many digital image editing systems can utilize patch-based approaches to borrow example pixels from other portions of a digital image to fill flawed regions. Other digital image editing systems fill regions of digital images by implementing learning-based deep networks to learn natural image distributions by training over large datasets. Despite these advancements, conventional digital image editing systems continue to experience a number of impediments or disadvantages, particularly with regard to accuracy, efficiency, and flexibility.

SUMMARY

One or more embodiments described herein provide benefits and solve one or more of the foregoing or other problems in the art with systems, methods, and non-transitory computer readable media that accurately, efficiently, and flexibly generate modified digital images utilizing a guided inpainting approach. In particular, in one or more embodiments, the disclosed systems implement a hybrid guided patch match model that implements patch-based and deep network approaches in a unique digital image processing pipeline. Specifically, the disclosed systems combine the high-quality texture synthesis capability of a patch-based approach with image semantic understanding capability of a deep network approach. In some embodiments, the disclosed systems automatically generate guidance maps to help identify replacement pixels for inpainting regions of digital images. For example, the disclosed systems generate guidance maps in the form of structure maps, depths maps, segmentation maps (or other visual guides). The disclosed systems can generate these guidance maps using an inpainting neural network in conjunction with a visual guide algorithm or by utilizing a stand-alone visual guide algorithm, such as generator neural network or teacher-student network architecture. In addition, in some embodiments the disclosed systems implement a patch match model to identify replacement pixels for filling regions of digital images according to these deep visual guides. By utilizing a deep visual guide together with a patch match model, the disclosed systems can accurately, efficiently, and flexibly generate realistic modified digital images at a variety of resolutions.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
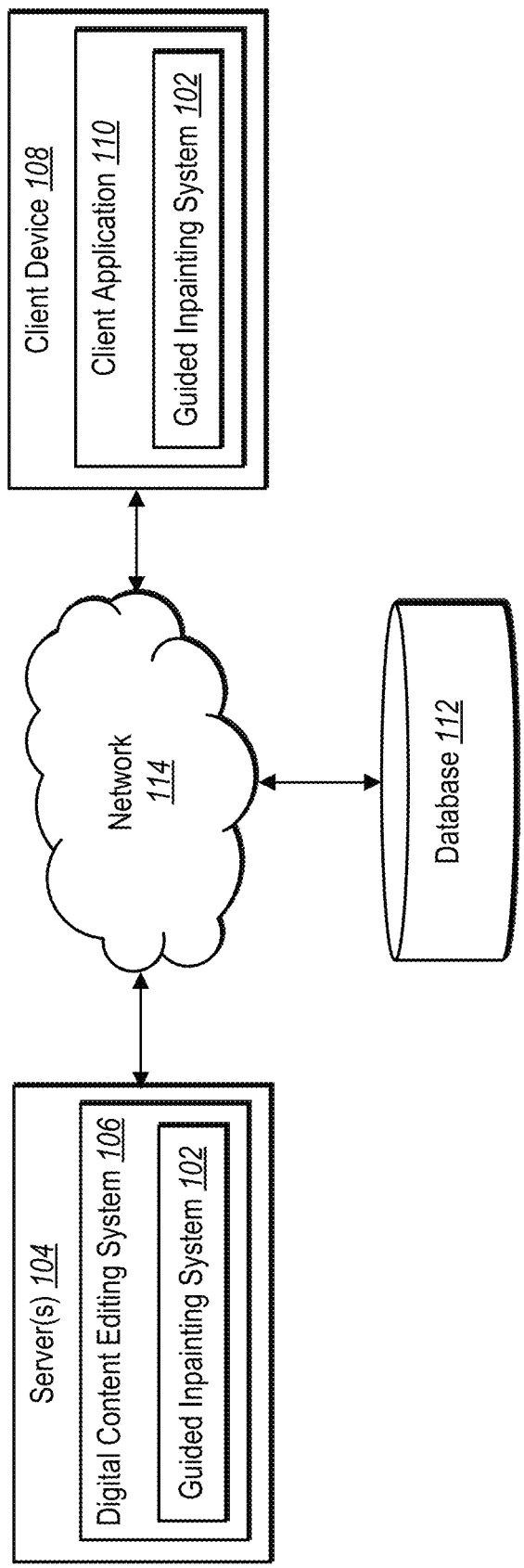
FIG. 1 illustrates an example system environment in which a guided inpainting system operates in accordance with one or more embodiments.

One or more embodiments described herein include a guided inpainting system that accurately, efficiently, and flexibly generates modified digital images utilizing a guided inpainting approach. In particular, in one or more embodiments, the guided inpainting system generates a deep visual guide that informs a patch match model to identify replacement pixels for inpainting a region of a digital image. To generate the deep visual guide, the guided inpainting system utilizes a visual guide algorithm such as a segmentation image neural network, an image depth neural network, a structure image model, or a combination of two or more of the above. Indeed, in some implementations the guided inpainting system generates one or more of a structure image guide, an image depth guide, or a segmentation image guide from a digital image. In addition, the guided inpainting system implements a patch match model to identify replacement pixels indicated by the deep visual guide and to inpaint a region of a digital image using the replacement pixels. By utilizing a deep visual guide together with a patch match model, the guided inpainting system can accurately, efficiently, and flexibly generate realistic modified digital images in virtually any resolution.

As just mentioned, in one or more embodiments the guided inpainting system utilizes a deep visual guide together with a patch match model to inpaint regions of a digital image that are missing, blurry, or otherwise undesirable. For example, the guided inpainting system utilizes a visual guide algorithm to generate a deep visual guide for identifying replacement pixels to fill a region of a digital image. In some cases, the guided inpainting system receives a request to edit a digital image that includes missing or undesirable pixels in one or more regions. Based on the request, in some embodiments, the guided inpainting system generates an inpainted version of the digital image utilizing a pretrained inpainting neural network. For instance, the guided inpainting system utilizes an inpainting neural network to process the digital image and fill the region of pixels to replace with an initial set of replacement pixels. In certain cases, the inpainted digital image is a lower resolution version of the digital image, and the initial set of replacement pixels are a preliminary replacement for the region of the digital image.

As also mentioned above, in certain embodiments, the guided inpainting system generates a deep visual guide to assist in accurately filling the region of the digital image. In some cases, the guided inpainting system generates a deep visual guide from the preliminary inpainted digital image. In other cases, the guided inpainting system generates a deep visual guide directly from the digital image with the missing or undesirable region.

For example, to generate the deep visual guide from the inpainted digital image the guided inpainting system utilizes a visual guide algorithm. More specifically, in one or more embodiments the guided inpainting system utilizes a visual guide algorithm such as one or more of a structure image model, an image depth neural network, or a segmentation image neural network. For instance, the guided inpainting system utilizes a structure image model to generate a deep visual guide in the form of a structure image guide indicating one or more structures within the inpainted digital image. In some embodiments, the guided inpainting system utilizes an image depth neural network to generate a deep visual guide in the form of an image depth guide that indicates different depths within the inpainted digital image. In these or other embodiments, the guided inpainting system utilizes a segmentation image neural network to generate a deep visual guide in the form of a segmentation image guide that indicates different semantic segmentations within the inpainted digital image.

As mentioned above, in some embodiments, the guided image inpainting system generates the deep visual guide directly from the initial digital image that has the missing or undesirable region. For example, the guided inpainting system utilizes one or more of a generator neural network or a teacher-student neural network framework. To elaborate, in one or more embodiments the guided inpainting system utilizes a generator neural network that includes an encoder neural network and a decoder neural network to generate a deep visual guide by predicting the structure within the missing or undesirable region(s). For instance, the guided inpainting system utilizes the generator neural network to predict the structure within the region by processing one or more of the initial digital image, an intermediate digital image indicating a structure outside of the region, and/or a binary mask indicating the region.

In one or more embodiments that utilize the teacher-student neural network framework, the guided inpainting system generates a deep visual guide by utilizing a student neural network to predict one or more of a depth or a segmentation within the region of pixels to replace. For example, the guided inpainting system utilizes the student neural network to predict the depth or the segmentation according to parameters learned from a teacher neural network. Indeed, in certain cases, the guided inpainting system learns the parameters by utilizing the teacher neural network to generate labels for a full digital image and utilizing the student neural network to generate the similar labels by processing an incomplete digital image (e.g., a version of the same digital image processed by the teacher neural network but with one or more regions of missing or undesirable pixels). After training, the guided inpainting system can utilize the student neural network to generate digital visual guides (e.g., structure images or depth maps) for digital images, including digital images with holes or other replacement regions.

In some cases, the guided inpainting system combines multiple types or variations of deep visual guides in generating a modified digital image. For instance, the guided inpainting system assigns weights to the structure image guide (or the structure image model), the image depth guide (or the image depth neural network), and the segmentation image guide (or the segmentation image neural network) to combine (one or of the above) with a patch match model used to identify replacement pixels from a digital image. In one or more embodiments, based on generating the deep visual guide, the guided inpainting system identifies replacement pixels for filling or inpainting the region of the digital image with missing or undesirable pixels. More specifically, the guided inpainting system utilizes the deep visual guide together with a patch match model to identify replacement pixels within the initial digital image (or within another digital image). For instance, the guided inpainting system utilizes a structure image guide to identify pixels within the digital image having a structure corresponding to a structure of the region of pixels to replace. As another example, the guided inpainting system utilizes an image depth guide to identify pixels having a depth corresponding to a depth of the region. As yet another example, the guided inpainting system utilizes a segmentation image guide to identify pixels having a semantic segmentation corresponding to a semantic segmentation of the region.

In some embodiments, the guided inpainting system utilizes a cost function of the patch match model to identify and select replacement pixels from a digital image. For instance, the guided inpainting system utilizes a cost function that determines distances between pixels that are to be replaced and potential replacement pixels. In some cases, to combine one or more variations of deep visual guide with the patch match model in the replacement pixel identification and selection process, the guided inpainting system modifies the cost function. For example, the guided inpainting system modifies the cost function based on a weighted combination of the initial patch match cost function and one or more of the structure image guide, the image depth guide, and/or the segmentation image guide (with their respective weights). Thus, the guided inpainting system identifies replacement pixels based on the patch match model and one or more variations of a deep visual guide.

As mentioned above, in some embodiments the guided inpainting system generates a modified digital image by replacing or inpainting the region of the digital image with missing or undesirable pixels. For example, the guided inpainting system utilizes a patch match model to generate a modified digital image by replacing a region of a digital image with replacement pixels identified via the deep visual guide. In particular, the guided inpainting system can guide the patch model to identify replacement pixels for a region based on the segments, structures, and/or depths reflected within the deep visual guide.

As mentioned, conventional digital image editing systems exhibit a number of drawbacks, particularly in accuracy, efficiency, and flexibility. To illustrate, many conventional systems inaccurately modify digital images. For example, digital image editing systems that utilize conventional patch-based approaches often lack a semantic or geometric understanding of digital image content. As a result, these conventional systems often inaccurately select replacement pixels that are visually jarring or out-of-place to fill a region of a digital image. In addition, conventional systems that utilize neural network approaches often generate digital images that lack realistic textural details.

In addition, many conventional digital image editing systems are also inefficient. In particular, to generate accurate digital images, conventional systems often require digital image editing systems require significant user interactions, time, and corresponding computing resources (e.g., processing power and memory). For example, client devices often provide various user interfaces and interactive tools to correct errors in regions. To illustrate, conventional systems often require user interaction to identify color guidance regions outside of holes within a digital image. In addition, correcting resulting errors from applying inpainting algorithms often requires client devices to zoom, pan, select, and iteratively apply various algorithms to accurately fill regions within digital images.

In addition, conventional digital image editing systems are also inflexible. For instance, as discussed above, conventional systems are often unable to accurately inpaint digital images that require semantic awareness across different features of a digital image as well as textural consistency. In addition, because of the significant memory constraints of many conventional systems that utilize neural network approaches, such systems are often rigidly limited to inpainting low-resolution digital images. Accordingly, conventional systems are often unable to process high-quality texture in digital images with resolutions exceeding 1K.

As suggested above, embodiments of the guided inpainting system can provide several advantages over conventional digital image editing systems. For example, embodiments of the guided inpainting system can provide improved accuracy over conventional systems. While many conventional systems inaccurately modify digital image by copy-pasting incorrect or out-of-place pixels to fill regions of a digital image, the guided inpainting system utilizes a guided approach that considers the semantics and textures of the digital image. Indeed, certain embodiments of the guided inpainting system utilize a deep visual guide that accounts for different structures, depths, and/or segmentations of digital image to accurately select replacement pixels that fit a missing or undesirable region more cohesively.

The guided inpainting system can also improve computational efficiency over many conventional digital image editing systems. Indeed, by generating digital images and filling regions utilizing an inpainting neural network/visual guide algorithm and a patch match model, the guided inpainting system can avoid user interfaces, interactions, tools, and algorithms for identifying color regions within or outside a fill region. Moreover, with more accurate pixel representations, the guided inpainting system can significantly reduce user interface interactions, time, and corresponding computing resources in correcting fill pixels. Indeed, the guided inpainting system can automatically fill regions of digital images with a single user interface, minimal user interaction (e.g., a single click of a button), and significantly reduced time (e.g., in seconds).

Moreover, embodiments of the guided inpainting system further improve flexibility over conventional digital image editing systems. As an initial matter, the guided inpainting system can generate accurate digital images reflecting both semantic and textural features of a digital image. Moreover, some embodiments of the guided inpainting system are adaptable to generate high quality, photo-realistic textures in higher resolutions than many conventional systems. Indeed, conventional systems that utilize neural networks are often fixed to generating digital images only in lower resolutions (e.g., less than 1K). The guided inpainting system, by contrast, uses a deep visual guide to process digital images at a low resolution together with a patch match model that can generate accurate output digital images at a variety of resolutions (e.g., high resolution or low resolution). Accordingly, the guided inpainting system can flexibly adapt to generate modified digital images in virtually any resolution, even high resolutions commonly utilized in contemporary digital images.

In sum, conventional systems that utilize patch-based approaches lack semantic understanding and conventional systems that utilize neural network approaches lack realistic texture and fail to operate on high-resolution images. In contrast, the guided inpainting system provides high-quality texture synthesis with image semantic understanding in efficiently, accurately, and flexibly generating digital images across a variety of different resolutions.

Additional detail regarding the guided inpainting system will now be provided with reference to the figures. For example, FIG. 1 illustrates a schematic diagram of an example system environment for implementing a guided inpainting system 102 in accordance with one or more embodiments. An overview of the guided inpainting system 102 is described in relation to FIG. 1. Thereafter, a more detailed description of the components and processes of the guided inpainting system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 12.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single client device 108, in some embodiments the environment includes multiple different client devices, each associated with a different user (e.g., a digital image editor). The client device 108 communicates with the server(s) 104 via the network 114. For example, the client device 108 receives user input from a user interacting with the client device 108 (e.g., via the client application 110) to, for instance, edit or modify a digital image by filling or replacing pixels of one or more regions of the digital image. In some cases, the client device 108 receives user input via the client application 110 to generate a digital content operation sequence and/or to execute a digital content operation sequence. Thus, the guided inpainting system 102 on the server(s) 104 receives information or instructions to generate a modified digital content item utilizing one or more digital content editing operations stored within the database 112.

As shown, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. The client application 110 presents or displays information to a user, including a digital image editing interface. In some cases, a user interacts with the client application 110 to provide user input to perform operations as mentioned above, such as modifying a digital image by removing an object and/or replacing or filling pixels in one or more regions of the digital image.

In some embodiments, all or part of the guided inpainting system 102 can be implemented using the client application 110 (or the client device 108). For example, the guided inpainting system 102 includes a web hosting application that allows the client device 108 to interact with the server(s) 104 to send and receive data such as deep visual guides and modified digital images (e.g., generated by the server(s) 104). In some cases, the guided inpainting system 102 generates and provides modified digital images via deep visual guides entirely on the client device 108 (e.g., utilizing the processing capabilities locally on the client device 108) without necessarily communicating with the server(s) 104.

As illustrated in FIG. 1, the environment includes the server(s) 104. The server(s) 104 generates, tracks, stores, processes, receives, and transmits electronic data, such as digital images, visual guide algorithms, deep visual guides, patch match models, and indications of user interactions. For example, the server(s) 104 receives data from the client device 108 in the form of an indication of user interaction selecting a digital image editing operation (e.g., to remove an object or replace pixels of a particular region). In addition, the server(s) 104 transmits data to the client device 108 to provide a modified digital image including an inpainted region with pixels replaced via a patch match model together with a deep visual guide. Indeed, the server(s) 104 communicates with the client device 108 to transmit and/or receive data via the network 114. In some embodiments, the server(s) 104 comprises a distributed server where the server(s) 104 includes a number of server devices distributed across the network 114 and located in different physical locations. The server(s) 104 comprises a digital image server, a content server, an application server, a communication server, a web-hosting server, a multidimensional server, or a machine learning server.

As shown in FIG. 1, the server(s) 104 also includes the guided inpainting system 102 as part of a digital content editing system 106. The digital content editing system 106 communicates with the client device 108 to perform various functions associated with the client application 110 such as storing and managing a repository of digital images, modifying digital images, and providing modified digital images items for display. For example, the guided inpainting system 102 communicates with the database 112 to access a digital image, a patch match model, and a visual guide algorithm used to modify the digital image. Indeed, as further shown in FIG. 1, the environment includes a database 112. In particular, the database 112 stores information such as digital images, visual guide algorithm, deep visual guides, patch match models, and/or other types of neural networks.

Although FIG. 1 illustrates a particular arrangement of the environment, in some embodiments, the environment has a different arrangement of components and/or may have a different number or set of components altogether. For instance, in some embodiments, the guided inpainting system 102 is implemented by (e.g., located entirely or in part on) the client device 108 and/or a third-party device. In addition, in one or more embodiments, the client device 108 communicates directly with the guided inpainting system 102, bypassing the network 114. Further, in some embodiments, the database 112 is located external to the server(s) 104 (e.g., in communication via the network 114) or located on the server(s) 104 and/or on the client device 108.

Figure 2:
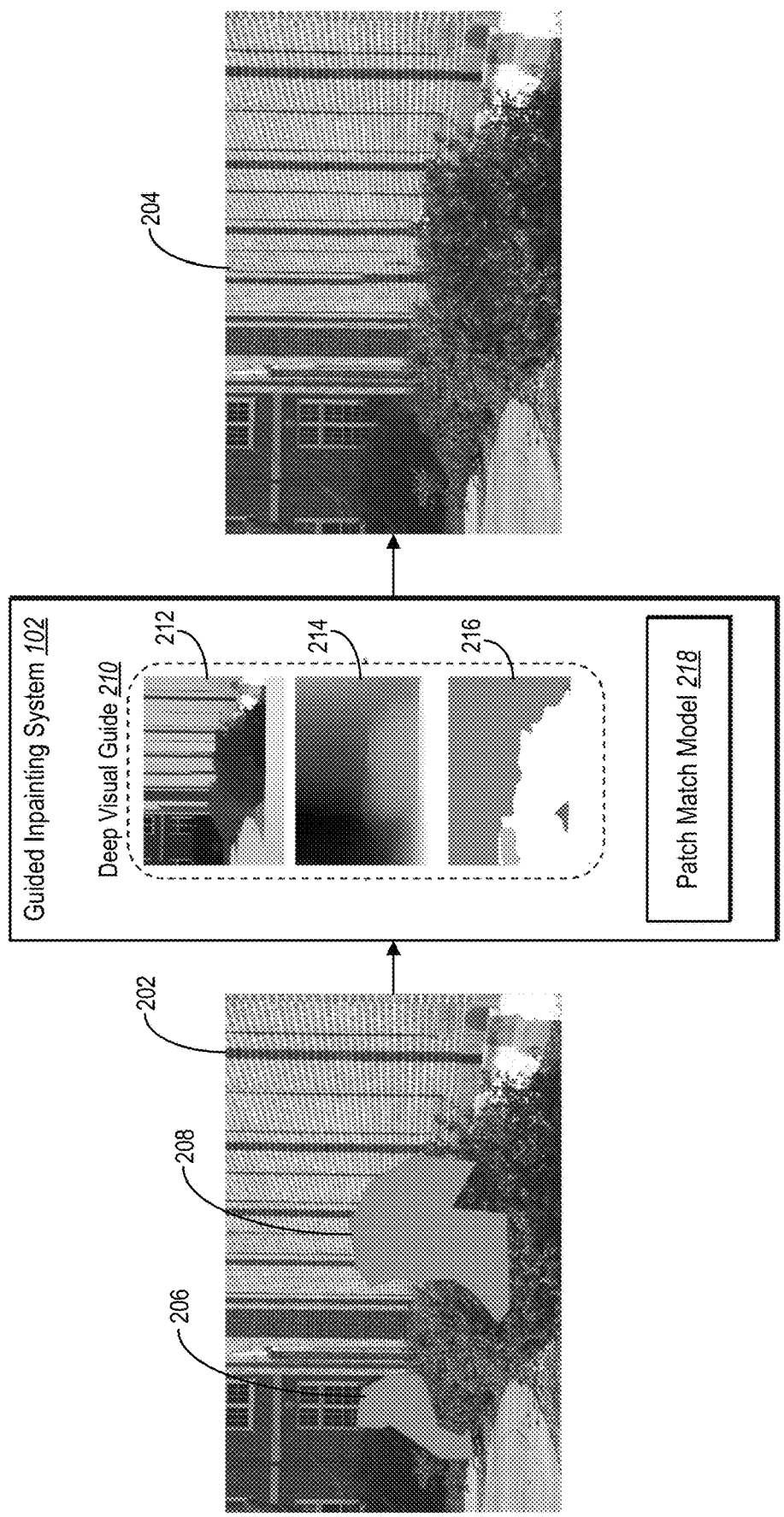
FIG. 2 illustrates an overview of generating a modified digital by inpainting one or more regions of an input digital image utilizing a patch match model and a deep visual guide in accordance with one or more embodiments.

As mentioned, in one or more embodiments, the guided inpainting system 102 generates a modified digital image by filling or replacing pixels in one or more regions. In particular, the guided inpainting system 102 utilizes a deep visual guide and a patch match model to identify replacement pixels for filling the one or more regions. FIG. 2 illustrates modifying a digital image by replacing regions 206 and 208 with missing or otherwise undesirable pixels utilizing a deep visual guide 210 and a patch match model 218 in accordance with one or more embodiments.

As illustrated in FIG. 2, the guided inpainting system 102 generates the modified digital image 204 from the initial digital image 202. Specifically, the guided inpainting system 102 utilizes a patch match model 218 and a deep visual guide 210 to identify replacement pixels and to fill the region 206 and the region 208 with pixels that result in a visually cohesive output (e.g., where replacement brick pixels are filled in places where bricks should be, and where replacement bush pixels are filled in places where bushes should be) in the form of the modified digital image 204.

A deep visual guide (e.g., the deep visual guide 210) includes a guide that instructs or informs a patch match model (e.g., the patch match model 218) to identify replacement pixels for filling a region (e.g., the region 206 and/or the region 208) of a digital image (e.g., the initial digital image 202). In some cases, the deep visual guide 210 includes a digital and/or visual representation of one or more structures within the initial digital image 202, one or more depths within the initial digital image 202, and/or one or more semantic segmentations within the initial digital image 202. For instance, the deep visual guide 210 includes a structure image guide 212 that indicates one or more structures within the initial digital image 202 (e.g., a structural image where pixels designate objects or structures and edges or boundaries between objects/structures), an image depth guide 214 that indicates one or more depths within the initial digital image 202 (e.g., a depth map where pixels reflect distances of objects from a viewer or camera capturing the digital image), a segmentation image guide 216 that indicates one or more semantic segmentations within the initial digital image 202 (e.g., a segmentation image where pixels reflect semantic labels of different portions of the digital image), and/or a combination of two or more of the above. In certain embodiments, the deep visual guide 210 includes one or more other types of guides such as an image color guide that indicates one or more colors within a digital image, an image normal guide that indicates one or more digital image normals within a digital image, and/or an image edge guide that indicates one or more edges identified within a digital image.

Relatedly, a patch match model (e.g., the patch match model 218) includes a model or computer algorithm that searches for and/or identifies replacement pixels from a digital image for filling or inpainting regions (e.g., the region 206 and/or the region 208) of pixels. For example, the patch match model 218 modifies the initial digital image 202 to replace the region 206 and the region 208 that include out-of-place or missing pixels with pixels from the digital image that are more visually cohesive in relation to other pixels of the initial digital image 202. Indeed, using a cost function, the patch match model 218 identifies pixels utilizing one or more pixel sampling techniques (e.g., random or probabilistic) to sample and compare pixels with those pixels in and around the region 206 and/or the region 208 of pixels to replace. In some embodiments, the patch match model 218 refers to the model described by Connelly Barnes, Eli Shechtman, Adam Finkelstein, and Dan B. Goldman in *Patchmatch: A Randomized Correspondence Algorithm for Structural Image Editing*, ACM Trans. Graph. 28(3):24 (2009), which is incorporated herein by reference in its entirety.

As mentioned above, to generate the deep visual guide 210, the guided inpainting system 102 utilizes a visual guide algorithm. A visual guide algorithm includes a computer model or algorithm that generates a deep visual guide (e.g., the deep visual guide 210). For example, a visual guide algorithm includes a structure image model that generates the structure image guide 212 from an inpainted digital image (e.g., an inpainted version of the initial digital image 202). Alternatively, a visual guide algorithm includes an image depth neural network that generates the image depth guide 214 from an inpainted digital image. Further, in some cases, a visual guide algorithm includes a segmentation image guide that generates the segmentation image guide 216 from an inpainted digital image. As another example, a visual guide algorithm generates a deep visual guide directly from the initial digital image 202. In these embodiments, a visual guide algorithm can include one or more of a generator neural network or a teacher-student neural network framework to generate a deep visual guide directly from the initial digital image 202.

A neural network includes a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data.

In one or more embodiments, an inpainted digital image includes a digital image generated by a deep inpainting neural network to preliminarily fill a region (e.g., the region 206 and/or the region 208) of pixels to replace with an initial set of replacement pixels. Indeed, the guided inpainting system 102 generates an inpainted digital image from the initial digital image 202 by utilizing a pretrained inpainting neural network to identify an initial set of replacement pixels to (roughly) inpaint the region 206 and/or the region 208 of the initial digital image 202. In some cases, an inpainted digital image has a lower resolution than the initial digital image 202 and the modified digital image 204.

As mentioned, through the various described acts of generating the modified digital image 204, in some embodiments the guided inpainting system 102 utilizes multiple neural networks having different architectures to identify and insert replacement pixels. For example, as mentioned above, the guided inpainting system utilizes a visual guide algorithm to generate the deep visual guide 210. As also mentioned, the guided inpainting system 102 utilizes an inpainting neural network to generate an inpainted digital image from the initial digital image 202. In some embodiments, an inpainting neural network includes a deep neural network that performs digital image inpainting with iterative confidence feedback and guided upsampling.

As illustrated in FIG. 2, the guided inpainting system 102 generates the modified digital image 204 utilizing both the deep visual guide 210 (e.g., one or more of the structure image guide 212, the image depth guide 214, or the segmentation image guide 216) and the patch match model 218. In some embodiments, the guided inpainting system 102 generates the deep visual guide 210 from an inpainted digital image. In other embodiments, the guided inpainting system 102 generates the deep visual guide 210 directly from the initial digital image 202 utilizing an alternative neural network such as a generator neural network or a teacher-student neural network framework.

Figure 3:
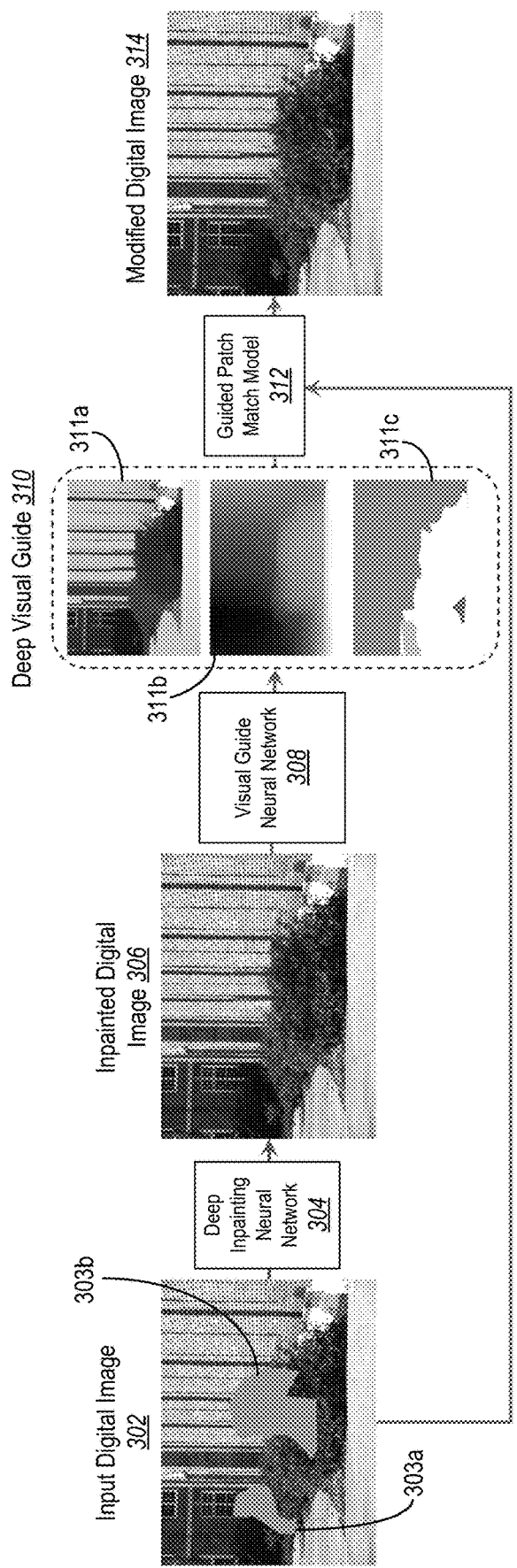
FIG. 3 illustrates an example process of generating a modified digital image by utilizing a deep visual guide generated from an inpainted digital image in accordance with one or more embodiments.

As just mentioned, in some implementations, the guided inpainting system 102 generates a deep visual guide (e.g., the deep visual guide 210) from an inpainted digital image. In particular, the guided inpainting system 102 first generates the inpainted digital image from an input digital image (e.g., the initial digital image 202) before then generating a deep visual guide (e.g., the deep visual guide 210). FIG. 3 illustrates generating a modified digital image 314 from an input digital image 302 (with one or more holes or regions of missing pixels) by generating a deep visual guide 310 from an inpainted digital image 306 in accordance with one or more embodiments.

As illustrated in FIG. 3, the guided inpainting system 102 generates the inpainted digital image 306 from the input digital image 302. More specifically, the guided inpainting system 102 utilizes the deep inpainting neural network 304 to generate the inpainted digital image 306 from the input digital image 302. For instance, the deep inpainting neural network 304 generates a low-resolution of the input digital image 302 and processes or analyzes the low-resolution image to identify an initial set of replacement pixels to fill or inpaint the missing or flawed regions 303a and 303b of the input digital image 302. In some embodiments, the deep inpainting neural network 304 is pretrained to identify an initial set of replacement pixels using parameters learned from a dataset of sample digital images. For example, the deep inpainting neural network 304 identifies (or receives an indication of) the regions 303a and 303b of pixels to replace and, based on the learned parameters, replaces the pixels in the regions 303a and 303b with pixels copied from other portions of the input digital image 302. In one or more embodiments, the guided inpainting system 102 utilizes a deep inpainting neural network 304 such as the neural network described by Yu Zeng, Zhe Lin, Jimei Yang, Jianming Zhang, Eli Shechtman, and Huchuan Lu in *High-resolution Inpainting with Iterative Confidence Feedback and Guided Upsampling*, arXiv:2005.11742 (2020), which is incorporated herein by reference in its entirety.

Indeed, as shown in FIG. 3, the inpainted digital image 306 includes a (lower resolution) version of the input digital image 302 with the regions 303a and 303b filled in, at least preliminarily with an initial, roughly matching set of replacement pixels. Looking closely, the pixels used to replace the regions 303a and 303b in generating the inpainted digital image 306 still have various flaws such as lower resolution, undesirable areas, and mismatched pixels that make the brick wall appear lumpy or curved. To ultimately generate the more accurate modified digital image 314, the guided inpainting system 102 further generates the deep visual guide 310 from the inpainted digital image 306.

More specifically, the guided inpainting system 102 utilizes the visual guide algorithm 308 to generate the deep visual guide 310 from the inpainted digital image 306. To elaborate, the guided inpainting system 102 generates the deep visual guide 310 in the form of a structure image guide 311a, an image depth guide 311b, a segmentation image guide 311c, or a combination of two or more of the above. In some cases, the visual guide algorithm 308 is pretrained with parameters learned from a database of sample digital images to generate deep visual guides in one form or another in accordance with the parameters.

As just mentioned, in some embodiments, the guided inpainting system 102 generates the structure image guide 311a as the deep visual guide 310. More specifically, the guided inpainting system 102 utilizes a structure image model as the visual guide algorithm 308 to process the inpainted digital image 306 and generate the structure image guide 311a. For example, the guided inpainting system 102 utilizes a structure image model to identify one or more different structures within the inpainted digital image 306. In some cases, the structure image model identifies structures based on detecting edges within the inpainted digital image 306.

To elaborate, the guided inpainting system 102 utilizes the structure image model to extract structures from the inpainted digital image 306 based on local variation measures (e.g., inherent variation and relative total variation). For instance, the structure image model identifies meaningful content and textural edges without assuming regularity or symmetry. In some cases, the structure image model further identifies, preserves, or removes texture (or at least some textural components) of a digital image as part of identifying edges or boundaries between different structural components. Accordingly, structural images tend to include large, cohesive regions identifying different structures (e.g., without small regional variations). Because structural images tend to provide large homogenous regions that indicate common structures, these images can provide an accurate resource for a patch match model in determining what regions to draw from in identifying replacement pixels (inasmuch as small regional variations can easily get washed out or overlooked in applying a patch match algorithm).

Additionally, the structure image model decomposes an optimization problem to extract main structures from the variation measures. Specifically, the structure image model extracts the main structures in accordance with parameters learned from comparing predicted structures against ground truth structure information over a dataset of sample digital images. In some embodiments, the guided inpainting system 102 utilizes a structure image model in the form of a computer vision algorithm such as RTV Smooth. For example, the guided inpainting system 102 utilizes the structure image model described by Li Zu, Qiong Yan, Yang Xia, and Jiaya Jia in *Structure Extraction from Texture via Relative Total Variation*, ACM Transactions on Graphics 31(6):1-10 (2012), which is incorporated by reference herein in its entirety. In some embodiments, the guided inpainting system 102 utilizes a different structure image model to identify various structures within a digital image.

In one or more embodiments, the guided inpainting system 102 generates the image depth guide 311b as the deep visual guide 310. In particular, the guided inpainting system 102 utilizes an image depth neural network as the visual guide algorithm 308 to process the inpainted digital image 306 and generate the image depth guide 311b. For example, the guided inpainting system 102 utilizes an image depth neural network to identify one or more different depths within the inpainted digital image 306.

To elaborate, the guided inpainting system 102 utilizes the image depth neural network to determine monocular depth predictions for different objects or structures within the inpainted digital image 306. In particular, the image depth neural network analyzes the inpainted digital image 306 to generate a single channel depth map. For instance, the image depth neural network generates the depth map in accordance with parameters learned from a dataset of sample digital images used for extracting pseudo depth data to compare with ground truth depth information. In some cases, the guided inpainting system 102 utilizes a pretrained image depth neural network such as DepthNet. For example, the guided inpainting system 102 utilizes the image depth neural network described by Ke Xian, Jianming Zhang, Oliver Wang, Long Mai, Zhe Lin, and Zhiguo Cao in *Structure-guided Ranking Loss for Single Image Depth Prediction*, which is incorporated by reference herein in its entirety. As another example, the guided inpainting system 102 utilizes a different image depth neural network such as a ResNet-50 architecture that utilizes a convolutional neural network approach (e.g., including a fully convolutional network and/or a residual neural network).

In certain embodiments, the guided inpainting system 102 generates the segmentation image guide 311c as the deep visual guide 310. More particularly, the guided inpainting system 102 utilizes a segmentation image neural network as the visual guide algorithm 308 to process the inpainted digital image 306 and generate the segmentation image guide 311c. For example, the guided inpainting system 102 utilizes a segmentation image neural network to identify one or more different semantic segmentations within the inpainted digital image 306.

More specifically, the guided inpainting system utilizes the segmentation image neural network to identify portions of the inpainted digital image 306 corresponding to different semantic labels. Indeed, the segmentation image neural network assigns labels to portions, objects, or structures of the inpainted digital image 306 in accordance with parameters learned from comparing predicted semantic labels with ground truth semantic labels over a dataset of sample digital images. In certain cases, the guided inpainting system 102 utilizes a pretrained segmentation image neural network such as SegmentNet. For example, the guided inpainting system 102 utilizes the segmentation image neural network described by Ke Sun, Yang Zhao, Borui Jian, Tianheng Cheng, Bin Xiao, Dong Liu, Yadong Mu, Xinggang Wang, Wenyu Liu, and Jingdong Wang in *High-resolution Representations for Labeling Pixels and Regions*, arXiv: 1904.04515 (2019), which is incorporated herein by reference in its entirety. As another example, the guided inpainting system 102 utilizes a different segmentation image neural network to label portions or objects of a digital image.

As further illustrated in FIG. 3, the guided inpainting system 102 utilizes the guided patch match model 312 to generate the modified digital image 314. Indeed, the guided inpainting system 102 utilizes the guided patch match model 312 that is informed by the deep visual guide 310. To generate the modified digital image, the guided inpainting system 102 utilizes the guided patch match model 312 to analyze the input digital image 302 to identify replacement pixels for the regions 303a and 303b as instructed by the deep visual guide 310. For instance, the guided patch match model 312 identifies the regions 303a and 303b and compares pixels from different portions of the input digital image 202 to identify good candidates for filling the regions 303a and 303b.

Specifically, the deep visual guide 310 informs the guided patch match model 312 where to identify replacement pixels from the input digital image 302. For instance, the deep visual guide 310 indicates portions of the input digital image 302 with a structure, a depth, and/or a semantic segmentation corresponding to the region 303a and/or the region 303b. Thus, the guided patch match model 312 analyzes pixels in those portions to identify and select replacement pixels for filling the regions 303a and 303b. Indeed, by filling the regions 303a and 303b, the guided inpainting system 102 thereby generates the semantically consistent modified digital image 314 (e.g., in high resolution to match a resolution of the input digital image 302) with accurate replacement pixels that are visually fit for the regions 303a and 303b. In some cases, the guided inpainting system 102 utilizes one or more specific techniques to determine structure, depth, and/or semantic segmentation from the input digital image 302. For instance, the guided inpainting system 102 implements the techniques described by Aaron Hertzmann, Charles E. Jacobs, Nuria Oliver, Brian Curless, and David H. Salesin in *Image Analogies*, Proceedings of the 28$^{th}$ Annual Conference on Computer Graphics and Interactive Techniques 327-40 (2001), which is incorporated by reference in its entirety.

In certain embodiments, the guided patch match model 312 is orthogonal to the visual guide algorithm 308 and the deep inpainting neural network 304. As a result, the guided patch match model is easily adaptable to different types of deep models or other systems that could be applied to generate deep visual guides. Thus, the hybrid approach of the guided inpainting system 102 in combining patch-based approaches with learning-based approaches enables flexible plug-and-play application for new developments in generating deep visual guides in the future.

Although FIG. 3 illustrates utilizing three different types of deep visual guide 310: i) a structure image guide, ii) an image depth guide, and iii) a segmentation image guide, other deep visual guides are possible. For example, in some embodiments, the guided inpainting system 102 generates the deep visual guide 310 from digital image normals of the input digital image 302. As another example, the guided inpainting system 102 generates the deep visual guide 310 utilizing edge filters to detect one or more edges within the input digital image 302.

As a further example, the guided inpainting system 102 generates a deep visual guide from raw color of the input digital image 302. However, while it was predicted that an image color guide would yield the best results in generating a modified digital image, researchers have determined that structure, depth, and segmentation unexpectedly perform better. In some embodiments, the guided inpainting system 120 combines color with one or more other types of deep visual guide to enhance accuracy and performance.

Figure 4:
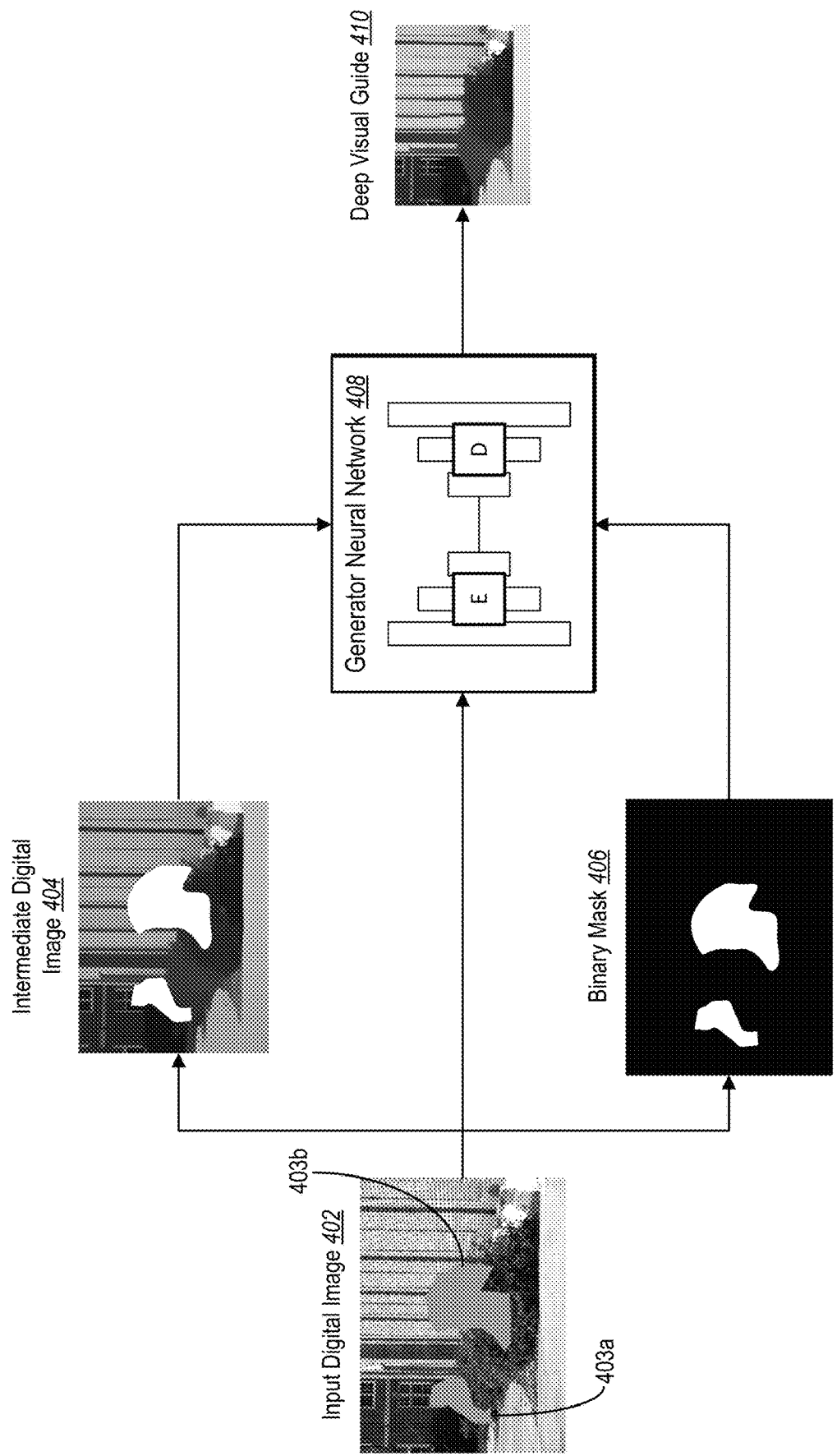
FIG. 4 illustrates an example process of generating a deep visual guide from an input digital image utilizing a generator neural network in accordance with one or more embodiments.

As mentioned above, in one or more embodiments, the guided inpainting system 102 generates a deep visual guide directly from an input digital image (e.g., without generating an inpainted digital image). In particular, in some cases, the guided inpainting system 102 extracts an occluded structure image and a binary mask from an input digital image and utilizes a generator neural network to generate a deep visual guide from the input digital image, the occluded structure image, and the binary mask. FIG. 4 illustrates utilizing a generator neural network 408 to generate a deep visual guide 410 directly from an input digital image 402 in accordance with one or more embodiments.

As illustrated in FIG. 4, the guided inpainting system 102 generates an intermediate digital image 404 (i.e., a structure image) from the input digital image 402. In particular, the guided inpainting system 102 generates the intermediate digital image 404 as an occluded structure image that indicates the structure of the input digital image 402 in one or more portions outside of the regions 403a and 403b of pixels to replace. To generate the intermediate digital image 404, the guided inpainting system 102 utilizes a structure image model to extract different structures from the input digital image 402. Additionally, the guided inpainting system 102 generates a binary mask 406 from the input digital image 402. The binary mask 406 indicates the regions 403a and 403b of pixels to replace.

As further illustrated in FIG. 4, the guided inpainting system 102 processes the input digital image 402, the intermediate digital image 404, and the binary mask 406 utilizing the generator neural network 408. In turn, the generator neural network 408, which includes an encoder neural network (represented by the "E") and a decoder neural network (represented by the "D"), generates the deep visual guide 410 in the form of a structure image guide. In some cases, the generator neural network 408 outputs a partial structure digital image indicating only the structure of the regions 403a and 403b (without indicating structure for other portions of the input digital image 402). In addition, the guided inpainting system 102 combines the partial structure output from the generator neural network 408 with the intermediate digital image 404 to generate the deep visual guide 410 indicating structure throughout the entire input digital image 402.

Although FIG. 4 illustrates utilizing the generator neural network 408 to generate a structure image guide, alternative embodiments are possible. For example, in some embodiments, the guided inpainting system 102 generates an image depth guide and/or a segmentation image guide utilizing the generator neural network 408. To generate an image depth guide, the guided inpainting system 102 generates an intermediate digital image (e.g., utilizing an image depth neural network) that indicates depths in portions of the input digital image 402 outside of the regions 403a and 403b. Additionally, the guided inpainting system 102 inputs the intermediate digital image into the generator neural network 408 to predict a depth for the regions 403a and a depth for the region 403b. Thus, the guided inpainting system 102 combines the predicted depths with the intermediate digital image to generate a deep visual guide in the form of an image depth guide.

To generate a segmentation image guide, the guided inpainting system 102 the guided inpainting system 102 generates an intermediate digital image (e.g., utilizing a segmentation image neural network) that indicates semantic segmentations for portions of the input digital image 402 outside of the regions 403a and 403b. Additionally, the guided inpainting system 102 inputs the intermediate digital image into the generator neural network 408 to predict one or more segmentations for the regions 403a and one or more segmentations for the region 403b. Thus, the guided inpainting system 102 combines the predicted segmentations with the intermediate digital image to generate a deep visual guide in the form of a segmentation image guide.

In one or more embodiments, the guided inpainting system 102 trains the generator neural network 408 to predict structure. For instance, the guided inpainting system 102 learns parameters for the constituent encoder neural network and the constituent decoder neural network that make up the generator neural network 408. To elaborate, the guided inpainting system 102 inputs a sample digital image into the encoder neural network which encodes or extracts a latent code or a feature representation of the sample digital image. In addition, the guided inpainting system 102 passes the encoded feature representation to the decoder neural network which decodes the feature representation to generate or reproduce the sample digital image (or a best approximation).

Further, the guided inpainting system 102 utilizes a discriminator neural network to test the generated or reproduced digital image to predict whether or not the image is real (e.g., from a digital image database) or artificial (e.g., generated by the generator neural network 408). In some embodiments, the guided inpainting system 102 utilizes an adversarial loss function loss to determine an error or a measure of loss associated with the generator neural network 408 (e.g., between the generator neural network 408 and the discriminator neural network). Indeed, the guided inpainting system 102 determines an adversarial loss which, in some cases, indicates how accurate (or inaccurate) a reconstructed digital image is and/or how effective the generator neural network 408 is at fooling the discriminator neural network into identifying an artificial digital image as a real digital image. The guided inpainting system 102 improves the generator neural network 408 by modifying parameters to reduce the adversarial loss over multiple iterations of generating reconstructed digital images and determining whether they are real or fake.

Additionally, in some embodiments, the guided inpainting system 102 further utilizes a supervised learning approach with an L1 loss to modify parameters and improve the generator neural network 408. For example, the guided inpainting system 102 inputs a sample digital image into the generator neural network 408, whereupon the generator neural network 408 generates a predicted deep visual guide (e.g., the deep visual guide 410). In addition, the guided inpainting system 102 utilizes an L1 loss function to compare the predicted deep visual guide with a ground truth deep visual guide (e.g., a ground truth deep visual guide stored as corresponding to the sample digital image). Utilizing the L1 loss function, the guided inpainting system 102 determines a measure of loss associated with the generator neural network 408. Further, the guided inpainting system 102 modifies parameters of the generator neural network 408 to reduce or minimize the L1 loss. The guided inpainting system 102 repeats the process of inputting sample digital images, generating predicted deep visual guides, comparing predicted deep visual guides with ground truth deep visual guides, and modifying parameters for multiple iterations or epochs (e.g., until the L1 loss satisfies a threshold loss).

Figure 5:
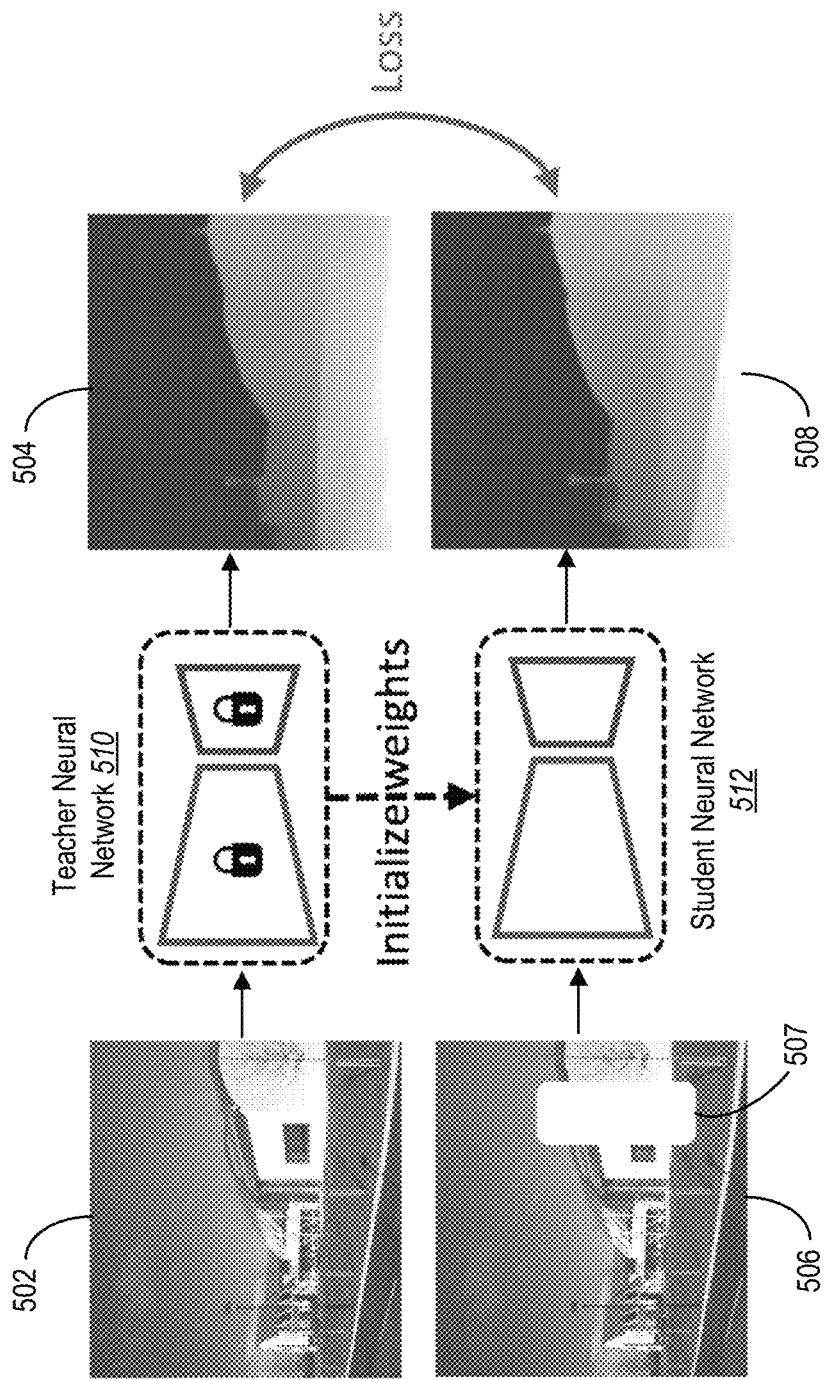
FIG. 5 illustrates an example process of generating a deep visual guide from an input digital image utilizing a teacher-student neural network framework in accordance with one or more embodiments.

As mentioned, in certain described embodiments, the guided inpainting system 102 utilizes a teacher-student neural network framework to generate a deep visual guide. In particular, the guided inpainting system 102 utilizes a student neural network with parameters learned from a teacher neural network to generate a deep visual guide directly from an input digital image. FIG. 5 illustrates generating a deep visual guide 508 utilizing a student neural network 512 with parameters learned from the teacher neural network 510 in accordance with one or more embodiments.

In some embodiments, a student neural network includes a neural network that learns or transfers parameters from a teacher neural network. A teacher neural network, on the other hand, includes a neural network that learns parameters through multiple learning iterations (e.g., generating predictions based on a sample dataset and modifying parameters to reduce measures of loss associated with the predictions).

As illustrated in FIG. 5, the guided inpainting system 102 utilizes the student neural network 512 to generate the deep visual guide 508 in the form of an image depth guide. Particularly, the guided inpainting system 102 utilizes the student neural network 512 to process the incomplete digital image 506 that includes the hole region 507 of pixels to replace, whereupon the student neural network 512 generates the deep visual guide 508 in accordance with parameters learned from the teacher neural network 510.

Indeed, the student neural network 512 includes parameters learned from the teacher neural network 510. As shown, the guided inpainting system 102 learns parameters for the student neural network 512 by transferring or adapting parameters from the teacher neural network 510. For example, the guided inpainting system 102 utilizes a teacher neural network 510 that is pretrained on a dataset of sample digital images to label depths of digital images. As shown, the guided inpainting system 102 inputs the full digital image 502 (e.g., a digital image with no regions of pixels to replace) into the teacher neural network 510. In turn, the teacher neural network 510 determines teacher labels for different depths and generates the image depth guide 504 using locked or frozen parameters.

As further illustrated in FIG. 5, the guided inpainting system 102 generates the incomplete digital image 506 from the full digital image 502. The incomplete digital image 506 includes a hole region 507 of pixels to replace. The guided inpainting system 102 further initializes the weights or the parameters of the student neural network 512 with the learned parameters of the teacher neural network 510.

Further, the guided inpainting system 102 inputs the incomplete digital image 506 into the student neural network 512, whereupon the student neural network 512 generates the deep visual guide 508 in accordance with the learned parameters. For example, the guided inpainting system 102 utilizes the student neural network 512 to generate predicted labels for different depths of the incomplete digital image 506. The guided inpainting system 102 utilizes the parameters learned or transferred from the teacher neural network 510 to generate a deep visual guide 508 from the incomplete digital image 506 with the hole region 507.

In one or more embodiments, the guided inpainting system 102 modifies parameters of the student neural network 512 to improve accuracy in generating output that resembles output of the teacher neural network 510. More specifically, the guided inpainting system 102 compares the predicted labels from the student neural network 512 with the teacher labels from the teacher neural network 510. In some cases, the guided inpainting system 102 utilizes a gradient loss function to determine a measure of loss associated with the student neural network 512 (or between the student neural network 512 and the teacher neural network 510). Additionally, the guided inpainting system 102 modifies parameters of the student neural network 512 to reduce the measure of loss. In certain embodiments, the guided inpainting system 102 utilizes a structure guided ranking loss ("SRGL") neural network for the teacher neural network 510 and/or the student neural network 512 when generating an image depth guide. By iteratively modifying parameters of the student neural network 512 based on teacher labels generated by the teacher neural network 510, the guided inpainting system 102 can train the student neural network 512 to generate accurate deep visual guides from digital images that include holes or other replacement regions.

Although FIG. 5 illustrates generating the deep visual guide 508 in the form of an image depth guide, additional embodiments are possible. For example, in some embodiments, the guided inpainting system 102 utilizes the teacher-student neural network framework to generate a deep visual guide in the form of a segmentation image guide. As another example, the guided inpainting system 102 utilizes the teacher-student neural network framework to generate a deep visual guide in the form of a structure image guide. To generate a segmentation image guide, the guided inpainting system 102 utilizes the student neural network 512 to process the incomplete digital image 506 and to generate a segmentation image guide according to parameters learned from the teacher neural network 510.

To learn the parameters for the student neural network 512, the guided inpainting system 102 processes the full digital image 502 utilizing the teacher neural network 510, whereupon the teacher neural network generates teacher labels for a segmentation image guide indicating semantic segmentations of the full digital image 502. As discussed above, the guided inpainting system 102 further transfers the parameters from the teacher neural network 510 to the student neural network 512. In addition, the guided inpainting system 102 utilizes the student neural network 512 to generate predicted labels for the semantic segmentations of the incomplete digital image 506.

As described, the guided inpainting system 102 encourages the student neural network 512 to generate (from the incomplete digital image 506) a segmentation image guide that resembles the one generated by the teacher neural network 510 (from the full digital image 502). Particularly, the guided inpainting system 102 utilizes a negative log likelihood loss function to determine a measure of loss associated with the student neural network 512. Further, the guided inpainting system 102 modifies the parameters of the student neural network 512 to reduce the measure of loss and to thereby generate output that more closely resembles output of the teacher neural network 510. In certain embodiments, the guided inpainting system 102 utilizes an HRNet neural network pretrained on the ADE20K dataset for the teacher neural network 510 and/or the student neural network 512 when generating a segmentation image guide.

Figure 6:
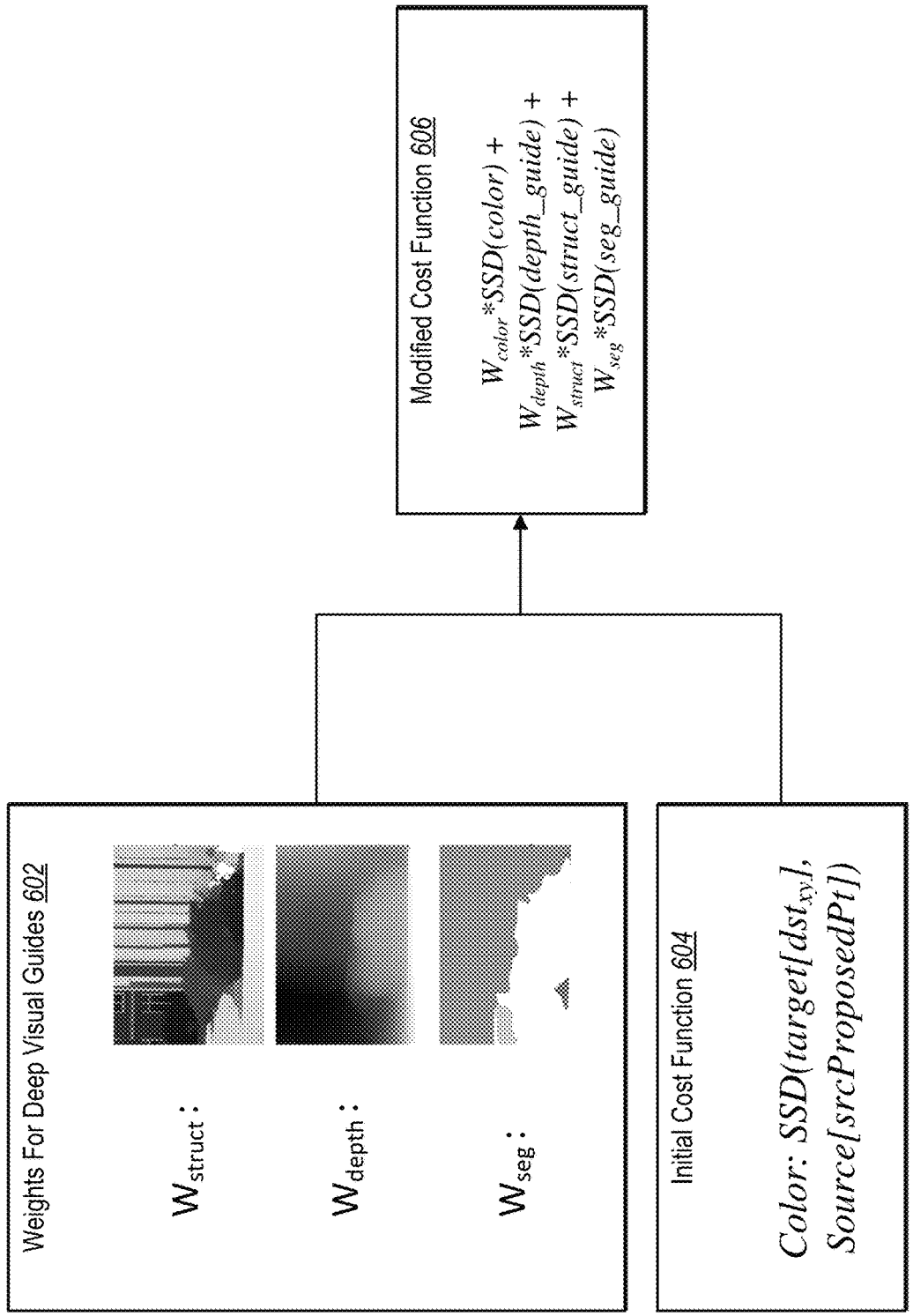
FIG. 6 illustrates utilizing multiple deep visual guides and a patch match model to identify replacement pixels in accordance with one or more embodiments.

As mentioned, in some embodiments, the guided inpainting system 102 combines a patch match model with one or more deep visual guides to identify and select replacement pixels. In particular, the guided inpainting system 102 utilizes a cost function as part of a patch match model to identify and select replacement pixels to fill a region of a digital image. FIG. 6 illustrates modifying and utilizing a patch match cost function to incorporate one or more deep visual guides in accordance with one or more embodiments.

As illustrated in FIG. 6, the guided inpainting system 102 determines weights for deep visual guides 602 (or their corresponding visual guide algorithms). In particular, the guided inpainting system 102 determines a structure weight for the structure image guide, a depth weight for the image depth guide, and a segmentation guide for the segmentation image guide. Based on the weights, the guided inpainting system 102 combines the deep visual guides (or their corresponding visual guide algorithms) to identify and select replacement pixels. In some cases, the guided inpainting system 102 utilizes default weights where the structure weight, the depth weight, and the segmentation weight are the same or different from each other.

As further illustrated in FIG. 6, the guided inpainting system 102 utilizes an initial cost function 604. To elaborate, the guided inpainting system 102 utilizes an initial cost function 604 as part of a patch match model (e.g., the patch match model 218) to identify and select replacement pixels from a digital image. For example, the guided inpainting system 102 utilizes the initial cost function 604 to determine relationships or distances between pixels in a missing region and pixels in a portion of potential replacement pixels. In some cases, the guided inpainting system 102 implements the initial cost function 604 to determine a sum of square differences ("SSD") between a target pixel or portion (e.g., a potential replacement pixel or portion currently being analyzed by the patch match model) in a target portion (e.g., specified by a two-dimensional point "$dst_{xy}$"), and a pixel or patch to be replaced by a two-dimensional point (e.g., "srcProposedPt"). For instance, the guided inpainting system 102 utilizes an initial cost function 604 given by:

$$SSD(target[dst_{xy}], source[srcProposedPt])$$

where SSD(.) determines the sum of square differences between the two terms $target[dst_{xy}]$ and $source[srcProposedPt]$, and where $target[dst_{xy}]$ is the potential replacement pixel(s) and $source[srcProposedPt]$ is the missing or undesirable pixel(s) to be replaced.

As illustrated in FIG. 6, the guided inpainting system 102 further generates a modified cost function 606. In particular, the guided inpainting system 102 modifies the initial loss function 604 with the weights for the deep visual guides 602. For example, the guided inpainting system 102 generates a weighted combination of the initial loss function and the weighted versions of the structure image guide, the image depth guide, and the segmentation image guide. Indeed, the guided inpainting system 102 combines two or more deep visual guides according to weights assigned to respective deep visual guides (or the corresponding visual guide algorithms). For example, the guided inpainting system 102 utilizes a modified cost function given by:

$$W_{color}*SSD(color)+W_{depth}*SSD(depth\_guide)+\\W_{struct}*SSD(struct\_guide)+W_{seg}*SSD(seg\_\\guide)$$

where SSD(color) represents the initial cost function 604 defined above (e.g., a color term), $W_{color}$ represents a color weight for the initial cost function 604, $W_{depth}$ represents a depth weight, $W_{struct}$ represents a structure weight, $W_{seg}$ represents a segmentation weight, SSD(depth_guide) represents a cost function for determining a sum of square differences between pixels to be replaced and pixels indicated as potential replacement pixels by an image depth guide, SSD(struct_guide) represents a cost function for determining a sum of square differences between pixels to be replaced and pixels indicated as potential replacement pixels by a structure image guide, and SSD(seg_guide) represents a cost function for determining a sum of square differences between pixels to be replaced and pixels indicated as potential replacement pixels by a segmentation image guide.

By utilizing the modified cost function 606, the guided inpainting system 102 utilizes more than one deep visual guide (e.g., a combined deep visual guide) for guiding a patch match model to identify replacement pixels. In particular, the guided inpainting system 102 generates a weighted combination of two or more of the structure image guide, the image depth guide, and/or the segmentation image guide to utilize for identifying replacement pixels (e.g., together with a patch match model). In some cases, the guided inpainting system 102 automatically determines the respective weights for the deep visual guides (e.g., by weighting them evenly or in a particular ascending or descending order). In these or other cases, the guided inpainting system 102 utilizes one or more of the weighted deep visual guides to modify the cost function of the patch match model (but does not necessarily use all three). For example, the guided inpainting system 102 utilizes a modified cost function such as:

$$0.6*SSD(color)+0.2*SSD(depth\_guide)+0.2*SSD(struct\_guide).$$

Figure 7:
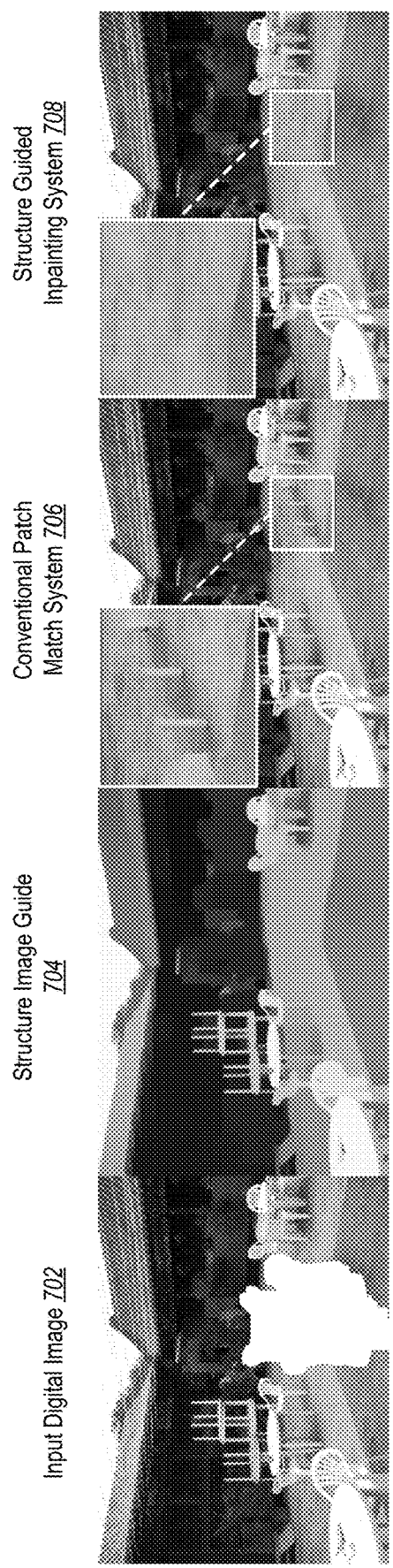
FIG. 7 illustrates a comparison of modified digital images generated by a conventional patch match system and a structure guided inpainting system in accordance with one or more embodiments.
Figure 8:
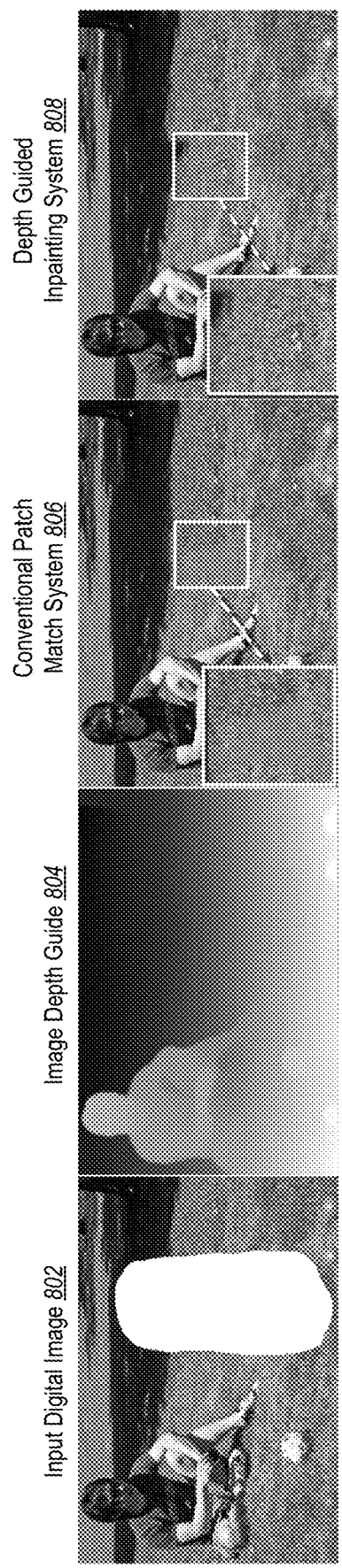
FIG. 8 illustrates comparison of modified digital images generated by a conventional patch match system and a depth guided inpainting system in accordance with one or more embodiments.
Figure 9:
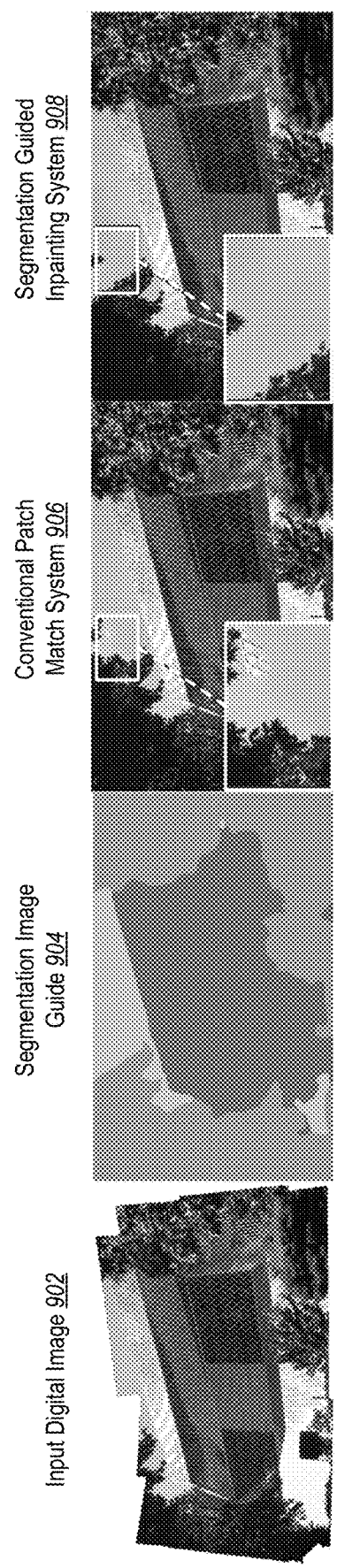
FIG. 9 illustrates comparison of modified digital images generated by a conventional patch match system and a segmentation guided inpainting system in accordance with one or more embodiments.

As mentioned above, in some embodiments, the guided inpainting system 102 improves accuracy over conventional digital image editing systems. In particular, the guided inpainting system 102 can generate modified digital images that are more semantically consistent and that include replacement pixels that more accurately fill regions of missing or undesirable pixels. FIGS. 7-9 illustrate example comparisons between modified digital images generated by the guided inpainting system 102 and modified digital images generated by a conventional patch match system in accordance with one or more embodiments.

For example, FIG. 7 illustrates a modified digital image 708 generated by an example embodiment of the guided inpainting system 102 using a structure image guide 704. Indeed, the example embodiment of the guided inpainting system 102 generates the structure image guide from the input digital image 702 and further generates the modified digital image 708 by filling the missing region of the input digital image 702 utilizing a structure guided patch match model. Comparing the modified digital image 708 with the modified digital image 706 generated by a conventional patch match system, the example embodiment of the guided inpainting system 102 performs better by using replacement pixels that do not add unwanted or semantically incoherent artifacts (which are added in the modified digital image 706). Indeed, the modified digital image 706 includes phantom table legs that are not present in the modified digital image 708.

FIG. 8 illustrates a comparison between output of the guided inpainting system 102 using an image depth guide 804 and output of a conventional patch match system in accordance with one or more embodiments. As shown, the example embodiment of the guided inpainting system 102 generates an image depth guide 804 from the input digital image 802. In addition, the guided inpainting system 102 generates the modified digital image 808 utilizing a depth guided patch match model. Comparing the modified digital image 808 with the modified digital image 806 generated by a conventional patch match system, the modified digital image 808 includes pixels that are less undesirable and more realistic-looking than the modified digital image 806.

FIG. 9 illustrates a comparison between output of the guided inpainting system 102 using a segmentation image guide 904 and output of a conventional patch match system in accordance with one or more embodiments. As shown, the example embodiment of the guided inpainting system 102 generates a segmentation image guide 904 from the input digital image 902. In addition, the guided inpainting system 102 generates the modified digital image 908 utilizing a segmentation guided patch match model. Comparing the modified digital image 908 with the modified digital image 906 generated by a conventional patch match system, the modified digital image 908 includes pixels that are better-matched to the sky of the input digital image 902 and that do not include added artifacts (unlike the modified digital image 906 that includes pixels that look like a portion of the building is floating in the sky).

Figure 10:
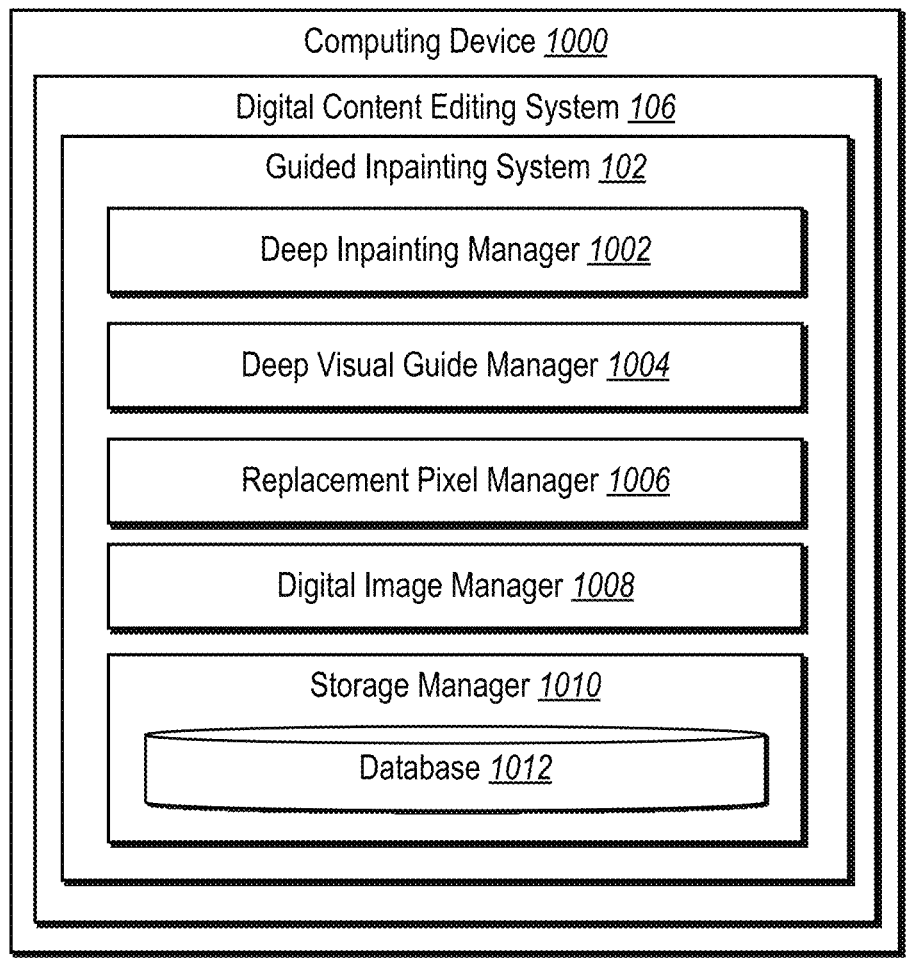
FIG. 10 illustrates a schematic diagram of a guided inpainting system in accordance with one or more embodiments.

Looking now to FIG. 10, additional detail will be provided regarding components and capabilities of the guided inpainting system 102. Specifically, FIG. 10 illustrates an example schematic diagram of the guided inpainting system 102 on an example computing device 1000 (e.g., one or more of the client device 108 and/or the server(s) 104). As shown in FIG. 10, the guided inpainting system 102 includes a deep inpainting manager 1002, a deep visual guide manager 1004, a replacement pixel manager 1006, a digital image manager 1008, and a storage manager 1010.

As just mentioned, the guided inpainting system 102 includes a deep inpainting manager 1002. In particular, the deep inpainting manager 1002 manages, maintains, stores, accesses, applies, utilizes, implements, or identifies a deep inpainting neural network. Indeed, the deep inpainting manager 1002 generates or creates a preliminary inpainted digital image from an input digital image by identifying an initial set of replacement pixels to use for filling one or more regions of pixels to replace within the input digital image.

In addition, the guided inpainting system 102 includes a deep visual guide manager 1004. In particular, the deep visual guide manager 1004 manages, maintains, stores, accesses, determines, generates, or identifies a deep visual guide. For example, the deep visual guide manager 1004 generates a deep visual guide from an inpainted digital image utilizing one or more visual guide algorithms. In some cases, the deep visual guide manager 1004 generates a deep visual guide directly from an input digital image (e.g., without using an inpainted digital image) via a generator neural network and/or a teacher-student neural network framework. In some embodiments, the deep visual guide manager 1004 generates a combined deep visual guide and/or learns parameters for one or more neural networks for generating deep visual guides, as described above.

As shown, the guided inpainting system 102 also includes a replacement pixel manager 1006. In particular, the replacement pixel manager 1006 manages, maintains, stores, determines, accesses, selects, or identifies replacement pixels from an input digital image (or a different digital image). For example, the replacement pixel manager 1006 utilizes a patch match model together with, or informed by, a deep visual guide to identify replacement pixels.

Further, the guided inpainting system 102 includes a digital image manager 1008. In particular, the digital image manager 1008 manages, stores, accesses, generates, creates, modifies, fills, inpaints, or identifies digital images. For example, the digital image manager 1008 utilizes a patch match model and a deep visual guide to generate a modified digital by filling a region of an input digital image with replacement pixels.

The guided inpainting system 102 further includes a storage manager 1010. The storage manager 1010 operates in conjunction with or include one or more memory devices such as the database 1012 (e.g., the database 112) that store various data such as a repository of digital images and various neural networks. The storage manager 1010 (e.g., via a non-transitory computer memory/one or more memory devices) stores and maintains data associated with generating inpainted digital images, generating deep visual guides, learning parameters for neural networks, and generating modified digital images via a guided patch match model (e.g., within the database 1012). For instance, the storage manager 1010 stores an inpainting neural network, a visual guide algorithm including at least one of a structure image model, an image depth neural network, or a segmentation image neural network, a patch match model, and a digital image including a region of pixels to replace.

In one or more embodiments, each of the components of the guided inpainting system 102 are in communication with one another using any suitable communication technologies. Additionally, the components of the guided inpainting system 102 is in communication with one or more other devices including one or more client devices described above. It will be recognized that although the components of the guided inpainting system 102 are shown to be separate in FIG. 10, any of the subcomponents may be combined into fewer components, such as into a single component, or divided into more components as may serve a particular implementation. Furthermore, although the components of FIG. 10 are described in connection with the guided inpainting system 102, at least some of the components for performing operations in conjunction with the guided inpainting system 102 described herein may be implemented on other devices within the environment.

The components of the guided inpainting system 102 can include software, hardware, or both. For example, the components of the guided inpainting system 102 can include one or more instructions stored on a computer-readable storage medium and executable by processors of one or more computing devices (e.g., the computing device 1000). When executed by the one or more processors, the computer-executable instructions of the guided inpainting system 102 can cause the computing device 1000 to perform the methods described herein. Alternatively, the components of the guided inpainting system 102 can comprise hardware, such as a special purpose processing device to perform a certain function or group of functions. Additionally, or alternatively, the components of the guided inpainting system 102 can include a combination of computer-executable instructions and hardware.

Furthermore, the components of the guided inpainting system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the guided inpainting system 102 may be implemented as part of a stand-alone application on a personal computing device or a mobile device. Alternatively, or additionally, the components of the guided inpainting system 102 may be implemented in any application that allows creation and delivery of marketing content to users, including, but not limited to, applications in ADOBE® EXPERIENCE MANAGER and CREATIVE CLOUD®, such as ADOBE® STOCK, PHOTOSHOP®, ILLUSTRATOR®, and INDESIGN®. "ADOBE," "ADOBE EXPERIENCE MANAGER," "CREATIVE CLOUD," "ADOBE STOCK," "PHOTOSHOP," "ILLUSTRATOR," and "INDESIGN" are either registered trademarks or trademarks of Adobe Inc. in the United States and/or other countries.

FIGS. 1-10 the corresponding text, and the examples provide a number of different systems, methods, and non-transitory computer readable media for generating modified digital image by identifying replacement pixels utilizing a guided patch match model. In addition to the foregoing, embodiments can also be described in terms of flowcharts comprising acts for accomplishing a particular result. For example, FIG. 11 illustrates a flowchart of example sequences or series of acts in accordance with one or more embodiments.

Figure 11:
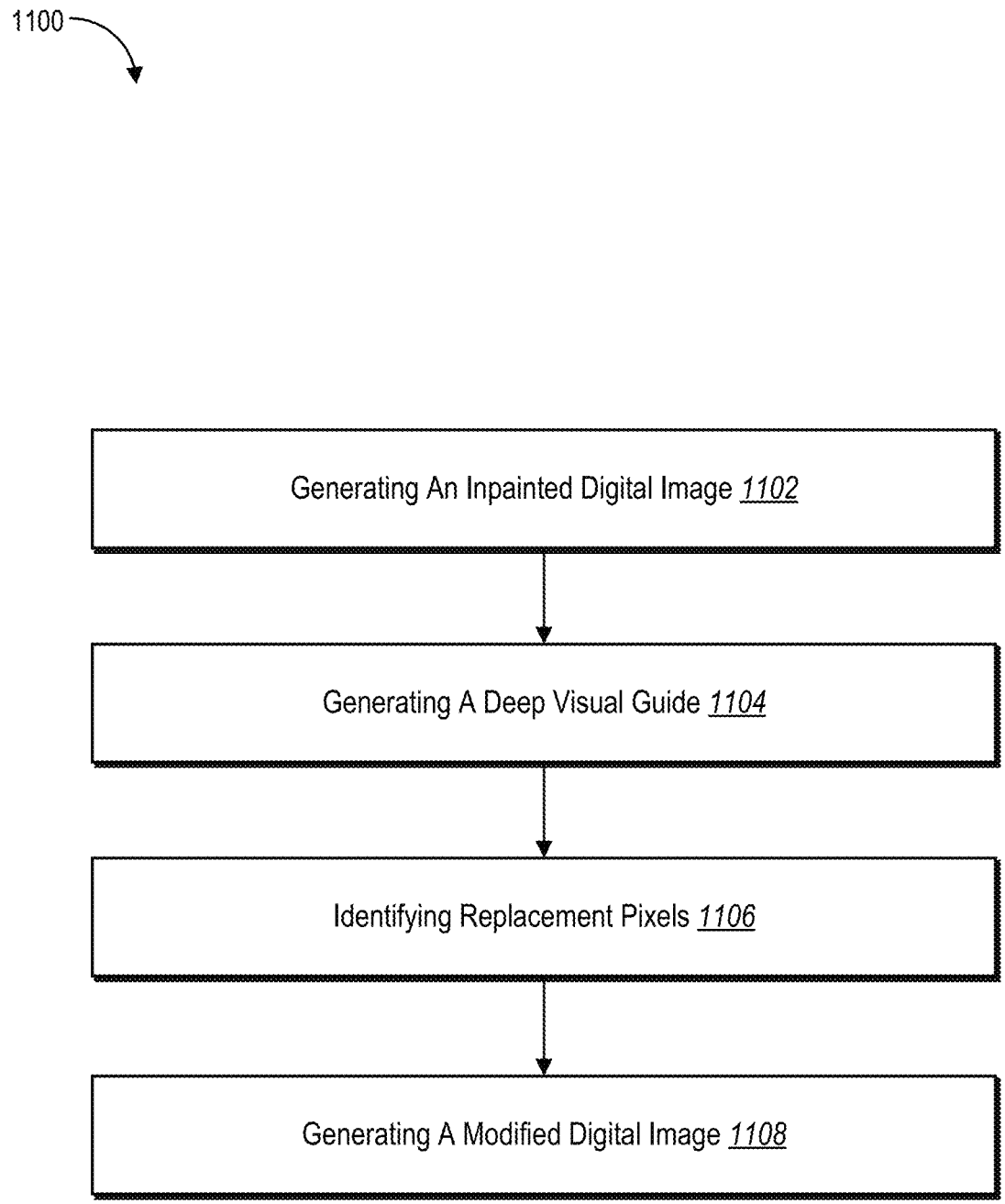
FIG. 11 illustrates a flowchart of a series of acts for generating modified digital image by identifying replacement pixels utilizing a guided patch match model in accordance with one or more embodiments.

While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 of generating modified digital image by identifying replacement pixels utilizing a guided patch match model. In particular, the series of acts 1100 includes an act 1102 of generating an inpainted digital image. For example, the act 1102 involves generating an inpainted digital image from the digital image utilizing an inpainting neural network, the inpainted digital image comprising an initial set of replacement pixels for the region.

As shown, the series of acts 1100 also includes an act 1104 of generating a deep visual guide. In particular, the act 1104 involves generating a deep visual guide from the inpainted digital image utilizing a visual guide algorithm. For example, the act 1104 involves generating a deep visual guide image that indicates one or more of a structure, a depth, or a semantic segmentation within the region of the digital image. In some embodiments, the act 1104 involves generating a deep visual guide comprising at least one of a structure image guide, an image depth guide, or a segmentation image guide from the inpainted digital image utilizing the visual guide algorithm. In some cases, identifying replacement pixels involves utilizing the patch match model to identify pixels within the digital image that correspond to the structure, the depth, or the semantic segmentation within the region of the digital image as indicated by the deep visual guide.

In some embodiments, the act 1104 involves utilizing the visual guide algorithm comprising a structure image model to generate a structure image guide from the inpainted digital image for identifying the replacement pixels from one or more structures identified within the inpainted digital image. In some cases, the act 1104 involve generating the structure image guide as the deep visual guide utilizing the structure image model to determine edges between different structural components of the inpainted digital image. In these or other embodiments, the act 1104 involves utilizing the visual guide algorithm comprising an image depth neural network to generate an image depth guide from the inpainted digital image for identifying the replacement pixels from a depth map of the inpainted digital image. In the same or other embodiments, the act 1104 involves utilizing the visual guide algorithm comprising an image depth neural network to generate an image depth guide from the inpainted digital image for identifying the replacement pixels from a depth map of the inpainted digital image. In certain embodiments, the act 1104 involves utilizing the visual guide algorithm comprising a segmentation image neural network to generate a segmentation image guide from the inpainted digital image for identifying the replacement pixels from semantic segmentations of the inpainted digital image.

Further, the series of acts 1100 includes an act 1106 of identifying replacement pixels. In particular, the act 1106 involves identifying replacement pixels from the digital image for the region of the digital image utilizing a patch match model and the deep visual guide. For example, the act 1106 involves utilizing the patch match model to identify one or more of: pixels of the digital image belonging to a structure of the region of pixels utilizing the structure image guide, pixels of the digital image with depths corresponding to a depth of the region of pixels utilizing the image depth guide, or pixels of the digital image belonging to a segment of the region of pixels utilizing the segmentation image guide.

As illustrated in FIG. 11, the series of acts 1100 includes an act 1108 of generating a modified digital image. In particular, the act 1108 involves generating the modified digital image by replacing the region of the digital image with the replacement pixels. For example, the act 1108 involves replacing the region of the digital image with the replacement pixels, wherein the modified digital image has a higher resolution than the inpainted digital image.

In some embodiments, the series of acts 1100 includes an act of selecting the visual guide algorithm for generating the deep visual guide from a set of visual guide algorithms from the digital image utilizing a convolutional neural network. In the same or other embodiments, the series of acts 1100 include an act of generating a combined deep visual guide comprising two or more of a structure image guide, an image depth guide, or a segmentation image guide. In these embodiments, the act 1108 involves identifying the replacement pixels utilizing the patch match model and the combined deep visual guide.

In one or more embodiments, the series of acts 1100 includes an act of selecting the visual guide algorithm for generating the deep visual guide from a set of deep visual guides including the structure image guide, the image depth guide, and the segmentation guide from the digital image utilizing a convolutional neural network. In certain cases, the series of acts 1100 includes an act of determining measures of correspondence between the digital image and each of the structure image model, the image depth neural network, and the segmentation image neural network utilizing a convolutional neural network.

Additionally, the series of acts 1100 includes an act of assigning weights to each of the structure image model, the image depth neural network, and the segmentation image neural network in accordance with the measures of correspondence. Further, the series of acts 1100 includes an act of generating the deep visual guide by combining two or more of the structure image guide, the image depth guide, or the segmentation image guide according to the weights. In some embodiments, the series of acts 1100 includes an act of learning parameters for the convolutional neural network from a database of digital images classified as corresponding to one or more of the structure image model, the image depth neural network, or the segmentation image neural network.

In certain embodiments, the series of acts 1100 includes an act of receiving a digital image comprising a region of pixels to replace. In these or other embodiments, the series of acts 1100 includes an act of generating an intermediate digital image indicating a structure for a portion of the digital image outside the region and an act of generating a binary mask indicating the region of the digital image. Additionally, the series of acts 1100 includes an act of utilizing a generator neural network to predict a structure within the region of the digital image from the digital image, the intermediate digital image, and the binary mask. In some cases, the series of acts 1100 includes acts of generating a binary mask indicating the region of the digital image, and generating the deep visual guide by utilizing a generator neural network to predict a structure within the region of the digital image based on the binary mask.

In one or more embodiments, the series of acts 1100 includes an act of utilizing a student neural network to predict one or more of a depth or a segmentation within the region of the digital image according to parameters learned from a teacher neural network. Further, the series of acts 1100 includes acts of determining teacher labels for one or more of depths or segmentations for a full digital image utilizing the teacher neural network, generating an incomplete digital image comprising a hole region from the full digital image, generating predicted labels for one or more of the depths or the segmentations for the incomplete digital image utilizing the student neural network, and modifying parameters of the student neural network by comparing the predicted labels with the teacher labels.

In some embodiments, the series of acts 1100 includes an act of utilizing a cost function of the patch match model to identify the replacement pixels from the digital image and the deep visual guide. For example, identifying the replacement pixels can involve utilizing the cost function to identify the replacement pixels according to a weighted combination of a structure image guide, an image depth guide, and a segmentation image guide.

The series of acts 1100 can include an act of identifying the replacement pixels from the digital image in accordance with a cost function of the patch match model that utilizes the deep visual guide. In some cases, the series of acts 1100 includes an act of utilizing the cost function to combine the deep visual guide and an additional deep visual guide by assigning weights to two or more of the structure image guide, the image depth guide, or the segmentation guide. Identifying the replacement pixels from the digital image can include utilizing the modified cost function to identify, according to the weights, the replacement pixels utilizing the structure image guide, the image depth guide, and the segmentation image guide.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
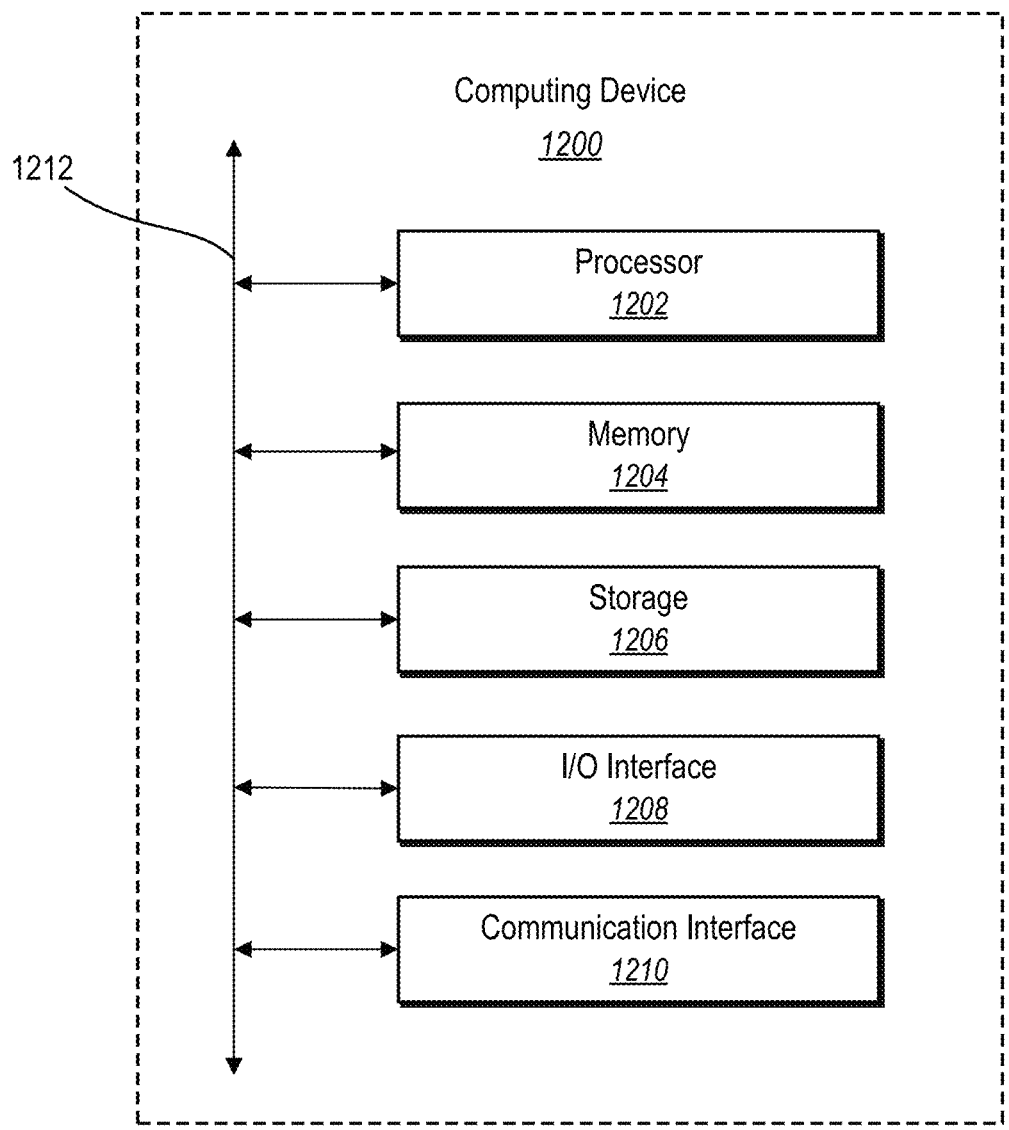
FIG. 12 illustrates a block diagram of an example computing device in accordance with one or more embodiments.

FIG. 12 illustrates, in block diagram form, an example computing device 1200 (e.g., the computing device 1000, the client device 108, and/or the server(s) 104) that may be configured to perform one or more of the processes described above. One will appreciate that the guided inpainting system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to replace pixels within a region of a digital image to generate a modified digital image by:
generating an inpainted digital image from the digital image utilizing an inpainting neural network, the inpainted digital image comprising an initial set of replacement pixels used to fill a region of the digital image;
generating, from the inpainted digital image utilizing a visual guide algorithm, a deep visual guide that informs patch match inpainting;
identifying replacement pixels for inpainting the region of the digital image by utilizing a patch match model with a weighted cost function to identify the replacement pixels according to a weighted combination of a structure image guide, an image depth guide, and a segmentation image guide indicated by the deep visual guide for potential replacement pixels, wherein the weighted cost function represents relationships between the pixels within the region of the digital image and the potential replacement pixels within additional regions of the digital image based on a modification of an initial cost function of the patch match model; and
generating, utilizing the patch match model, the modified digital image by replacing the region of the digital image with the replacement pixels.

2. The non-transitory computer readable medium of claim 1, wherein generating the deep visual guide comprises generating a deep visual guide image that indicates one or more of a structure from the structure image guide, a depth from the image depth guide, or and a semantic segmentation from the segmentation image guide within the region of the digital image.

3. The non-transitory computer readable medium of claim 2, wherein identifying the replacement pixels comprises utilizing the patch match model to identify the potential replacement pixels within the digital image that correspond to the structure, the depth, or the semantic segmentation within the region of the digital image as indicated by the deep visual guide.

4. The non-transitory computer readable medium of claim 1, wherein generating the deep visual guide comprises utilizing the visual guide algorithm comprising a structure image model to generate the structure image guide from the inpainted digital image for identifying the replacement pixels from one or more structures identified within the inpainted digital image.

5. The non-transitory computer readable medium of claim 1, wherein generating the deep visual guide comprises utilizing the visual guide algorithm comprising an image depth neural network to generate the image depth guide from the inpainted digital image for identifying the replacement pixels from a depth map of the inpainted digital image.

6. The non-transitory computer readable medium of claim 1, wherein generating the deep visual guide comprises utilizing the visual guide algorithm comprising a segmentation image neural network to generate the segmentation image guide from the inpainted digital image for identifying the replacement pixels from semantic segmentations of the inpainted digital image.

7. The non-transitory computer readable medium of claim 1, further comprising instructions that, when executed by the at least one processor, cause the computing device to generate the weighted cost function of the patch match model by modifying an initial cost function of the patch match model to include the one or more terms for comparing the potential replacement pixels indicated by the deep visual guide.

8. The non-transitory computer readable medium of claim 1, further comprising instructions that, when executed by the at least one processor, cause the computing device to utilize a student neural network to predict one or more of a depth or a segmentation within the region of the digital image according to parameters learned from a teacher neural network for the deep visual guide.

9. A system comprising:
one or more memory devices comprising:
an inpainting neural network; a visual guide algorithm comprising at least one of a structure image model, an image depth neural network, or a segmentation image neural network; a patch match model; and a digital image comprising a region of pixels to replace; and one or more computing devices that are configured to cause the system to:

generate an inpainted digital image from the digital image utilizing the inpainting neural network, the inpainted digital image comprising an initial set of replacement pixels used to fill the region of the digital image;

generate, from the inpainted digital image utilizing the visual guide algorithm, a deep visual guide that informs patch match inpainting comprising at least one of a structure image guide, an image depth guide, or and a segmentation image guide; and identify replacement pixels for inpainting the region of the digital image by utilizing the patch match model with a weighted cost function to identify the replacement pixels according to a weighted combination of a structure image guide, an image depth guide, and a segmentation image guide indicated by the deep visual guide for potential replacement pixels, wherein the weighted cost function represents relationships between the pixels within the region of the digital image and the potential replacement pixels within additional regions of the digital image based on a modification of an initial cost function of the patch match model.

10. The system of claim 9, wherein the one or more computing devices are further configured to cause the system to identify the replacement pixels from the digital image by utilizing the patch match model to identify one or more of:

pixels of the digital image corresponding to a structure of the region of pixels utilizing the structure image guide;

pixels of the digital image with depths corresponding to a depth of the region of pixels utilizing the image depth guide; or pixels of the digital image corresponding to a segment of the region of pixels utilizing the segmentation image guide.

11. The system of claim 9, wherein the one or more computing devices are further configured to cause the system to generate a modified digital image by replacing the region of the digital image with the replacement pixels, wherein the modified digital image has a higher resolution than the inpainted digital image.

12. The system of claim 9, wherein the one or more computing devices are further configured to cause the system to utilize the image depth neural network of the visual guide algorithm to generate the image depth guide from the inpainted digital image.

13. The system of claim 12, wherein the one or more computing devices are further configured to cause the system to utilize the segmentation image neural network of the visual guide algorithm to generate the segmentation image guide from the inpainted digital image.

14. The system of claim 9, wherein the one or more computing devices are further configured to cause the system to generate the structure image guide utilizing the structure image model to determine edges between different structural components of the inpainted digital image.

15. The system of claim 9, wherein the one or more computing devices are further configured to cause the system to:

generate a binary mask indicating the region of the digital image; and generate the deep visual guide by utilizing a generator neural network to predict a structure within the region of the digital image based on the binary mask.

16. A computer-implemented method comprising:

receiving a digital image comprising a region of pixels to replace;

generate an inpainted digital image from the digital image utilizing an inpainting neural network, the inpainted digital image comprising an initial set of replacement pixels used to fill the region of the digital image;

generating, utilizing a visual guide algorithm, a deep visual guide that informs patch match inpainting and that comprises a structure image guide, an image depth guide, and a segmentation image guide from the inpainted digital image;

identifying replacement pixels for inpainting the region of the digital image by utilizing a patch match model with a weighted cost function to identify the replacement pixels according to a weighted combination of a structure image guide, an image depth guide, and a segmentation image guide indicated by the deep visual guide for potential replacement pixels, wherein the weighted cost function represents relationships between the pixels within the region of the digital image and the potential replacement pixels within additional regions of the digital image based on a modification of an initial cost function of the patch match model; and generating, utilizing the patch match model, a modified digital image by replacing the region of the digital image with the replacement pixels.

17. The computer-implemented method of claim 16, wherein generating the deep visual guide comprises:

generating an intermediate digital image indicating a structure for a portion of the digital image outside the region; and generating a binary mask indicating the region of the inpainted digital image.

18. The computer-implemented method of claim 17, wherein generating the deep visual guide comprises utilizing a generator neural network to predict a structure within the region of the inpainted digital image, the intermediate digital image, and the binary mask.

19. The computer-implemented method of claim 16, wherein generating the deep visual guide comprises utilizing a student neural network to predict one or more of a depth as an image depth guide or a segmentation as a segmentation image guide within the region of the inpainted digital image according to parameters learned from a teacher neural network.

20. The computer-implemented method of claim 19, further comprising learning the parameters for the student neural network by:

determining teacher labels for one or more of depths or segmentations for a full digital image utilizing the teacher neural network;

generating an incomplete digital image comprising a hole region from the full digital image;

generating predicted labels for one or more of the depths or the segmentations for the incomplete digital image utilizing the student neural network; and modifying parameters of the student neural network by comparing the predicted labels with the teacher labels.

* * * * *